US012291875B1

(12) United States Patent
Scepaniak

(10) Patent No.: US 12,291,875 B1
(45) Date of Patent: May 6, 2025

(54) COMMERCIAL ROOFING SCREW MACHINE

(71) Applicant: SCEPANIAK IP HOLDINGS, LLC, Waite Park, MN (US)

(72) Inventor: Kurtis D. Scepaniak, Cold Spring, MN (US)

( * ) Notice: Subject to any disclaimer, the term of this patent is extended or adjusted under 35 U.S.C. 154(b) by 775 days.

(21) Appl. No.: 17/120,105

(22) Filed: Dec. 11, 2020

Related U.S. Application Data

(60) Provisional application No. 62/946,853, filed on Dec. 11, 2019.

(51) Int. Cl.
*E04D 15/04* (2006.01)
*B25B 21/00* (2006.01)

(52) U.S. Cl.
CPC ............ *E04D 15/04* (2013.01); *B25B 21/002* (2013.01); *E04D 2015/047* (2013.01)

(58) Field of Classification Search
CPC ....... B25B 21/00; B25B 21/007; B25B 23/02; B25B 23/04; B25B 23/045; B25B 23/06; B25B 23/065; B25B 23/08; B25B 23/10; B25B 31/00; B25C 5/16; B25C 5/1693; B25C 7/00; B27F 7/00; B27F 7/006; B27F 7/05; E04D 15/003; E04D 15/04; B23P 19/001; B23P 19/002; B23P 19/004; B23P 19/006; B23P 19/007; B23P 19/008; B23P 19/04; B23P 19/06; Y10T 29/53478; Y10T 29/5343; Y10T 29/535
See application file for complete search history.

(56) References Cited

U.S. PATENT DOCUMENTS

| | | | |
|---|---|---|---|
| 710,676 | A | 10/1902 | Finn |
| 2,111,280 | A | 3/1938 | Connell |
| 2,303,726 | A | 12/1942 | Dettloff et al. |
| 2,574,163 | A | 11/1951 | Bamford, Sr. |
| 3,752,277 | A | 8/1973 | Nakai |
| 3,757,613 | A | 9/1973 | Arndt et al. |

(Continued)

FOREIGN PATENT DOCUMENTS

| | | | |
|---|---|---|---|
| DE | 102005053575 A1 | 5/2007 | |
| DE | 112017001124 T5 * | 11/2018 | ........... B05B 13/005 |

(Continued)

*Primary Examiner* — David B. Thomas
(74) *Attorney, Agent, or Firm* — Albert W. Watkins

(57) ABSTRACT

A commercial roofing screw machine has: a plurality of screw guns that each properly place and install screw and washer pairs, both securely and in the right location, from separate magazines; automated operation with automatic or manual fastening pattern selection; sensors to recognize insulation sheets or marking lines, the high and low rib on the decking through the insulation, and torque; an indicia generator that marks fastener locations that did not hold correctly; and wireless communications for remote status checks, new programming uploads, troubleshooting, issue and error reporting, communicating with like or complementary machines to complete tasks, communicating with a records and reporting system to document fasteners installed correctly and which ones failed and were fixed by humans, and other beneficial purpose, and enabling plans upload with feature locations identified to select a fastening pattern based on location on a building and wind uplift ratings.

4 Claims, 16 Drawing Sheets

(56) References Cited

U.S. PATENT DOCUMENTS

| | | | | | |
|---|---|---|---|---|---|
| 3,765,587 | A | | 10/1973 | Davis | |
| 3,848,488 | A | | 11/1974 | Weisenburger | |
| 3,983,676 | A | | 10/1976 | Gilpin | |
| 4,154,308 | A | | 5/1979 | Eckman et al. | |
| 4,246,939 | A | | 1/1981 | Boegel | |
| 4,441,643 | A | | 4/1984 | McCutchen | |
| 4,492,504 | A | | 1/1985 | Hainsworth | |
| 4,657,167 | A | * | 4/1987 | Mays | E04D 15/04 227/114 |
| 4,870,750 | A | * | 10/1989 | Zahn | E04D 15/04 227/18 |
| 5,042,142 | A | * | 8/1991 | Beach | F16B 43/00 227/111 |
| 5,056,684 | A | | 10/1991 | Beach et al. | |
| 5,058,464 | A | * | 10/1991 | McGovern | B27F 7/006 81/433 |
| 5,081,815 | A | | 1/1992 | Carnell | |
| 5,156,244 | A | | 10/1992 | Pyles et al. | |
| 5,197,257 | A | | 3/1993 | Nietling | |
| 5,205,103 | A | | 4/1993 | Burton | |
| 5,331,732 | A | | 7/1994 | Kvalheim | |
| 5,347,707 | A | | 9/1994 | Beach | |
| 5,381,597 | A | * | 1/1995 | Petrove | E04D 15/02 29/709 |
| 5,445,297 | A | | 8/1995 | Beach et al. | |
| 5,505,676 | A | | 4/1996 | Bookshar | |
| 5,555,780 | A | | 9/1996 | Beach et al. | |
| 5,673,816 | A | | 10/1997 | Larson et al. | |
| 5,819,609 | A | | 10/1998 | Habermehl | |
| 5,826,468 | A | | 10/1998 | Daubinger et al. | |
| 5,921,454 | A | | 7/1999 | Larson et al. | |
| 5,960,678 | A | | 10/1999 | Kennedy | |
| 6,064,189 | A | * | 5/2000 | Frankel | B25B 21/002 324/207.16 |
| 6,142,352 | A | | 11/2000 | Larson et al. | |
| 6,269,996 | B1 | * | 8/2001 | McAllister | B27F 7/006 227/111 |
| 6,527,156 | B2 | * | 3/2003 | McAllister | B27F 7/006 227/111 |
| 6,742,245 | B2 | | 6/2004 | Glenn | |
| 6,755,334 | B2 | | 6/2004 | Ballent, Jr. | |
| 6,918,322 | B1 | | 7/2005 | Biller | |
| 6,944,944 | B1 | | 9/2005 | Craythorn et al. | |
| 7,591,630 | B2 | | 9/2009 | Lert, Jr. | |
| 7,681,311 | B2 | | 3/2010 | Kaminski | |
| 7,954,681 | B2 | * | 6/2011 | Smith | B27F 7/006 227/111 |
| 7,972,102 | B2 | | 7/2011 | Ward et al. | |
| 7,980,808 | B2 | | 7/2011 | Chilson et al. | |
| 7,991,505 | B2 | | 8/2011 | Lert, Jr. et al. | |
| 8,020,626 | B2 | | 9/2011 | Francis et al. | |
| 8,141,236 | B2 | | 3/2012 | Fawzi et al. | |
| 8,157,018 | B2 | | 4/2012 | Francis et al. | |
| 8,185,240 | B2 | | 5/2012 | Williams et al. | |
| 8,192,137 | B2 | | 6/2012 | Ross et al. | |
| 8,210,791 | B2 | | 7/2012 | Chilson et al. | |
| 8,316,739 | B2 | | 11/2012 | Vollmuth et al. | |
| 8,347,972 | B2 | | 1/2013 | Francis et al. | |
| 8,529,187 | B1 | | 9/2013 | Ward et al. | |
| 8,596,951 | B1 | | 12/2013 | Ward et al. | |
| 8,606,399 | B2 | | 12/2013 | Williams et al. | |
| 8,640,780 | B2 | | 2/2014 | Francis et al. | |
| 8,763,722 | B2 | | 7/2014 | Braun et al. | |
| 8,784,034 | B2 | | 7/2014 | Lert, Jr. | |
| 8,845,266 | B1 | | 9/2014 | Ward et al. | |
| 8,855,848 | B2 | | 10/2014 | Zeng | |
| 8,855,849 | B1 | | 10/2014 | Ferguson et al. | |
| 8,857,137 | B2 | | 10/2014 | Avnery | |
| 8,868,301 | B2 | | 10/2014 | Self et al. | |
| 8,874,300 | B2 | | 10/2014 | Allard et al. | |
| 8,874,360 | B2 | | 10/2014 | Klinger et al. | |
| 8,874,371 | B2 | | 10/2014 | Troy et al. | |
| 8,880,271 | B2 | | 11/2014 | Jeon | |
| 8,880,334 | B2 | | 11/2014 | Kini et al. | |
| 8,886,383 | B2 | | 11/2014 | Hyde et al. | |
| 8,886,385 | B2 | | 11/2014 | Takahashi et al. | |
| 8,892,294 | B2 | | 11/2014 | Waltz et al. | |
| 8,897,917 | B2 | | 11/2014 | Tanaka et al. | |
| 8,897,947 | B2 | | 11/2014 | Nakano et al. | |
| 8,899,903 | B1 | | 12/2014 | Saad et al. | |
| 9,353,519 | B2 | | 5/2016 | Williams | |
| 9,834,380 | B2 | | 12/2017 | Hamilton et al. | |
| 9,945,128 | B1 | * | 4/2018 | Baird | E04D 15/07 |
| 10,189,176 | B2 | | 1/2019 | Williams | |
| 10,399,215 | B2 | | 9/2019 | DeFoe et al. | |
| 10,474,126 | B2 | * | 11/2019 | Blum | B29C 66/0342 |
| 10,655,335 | B2 | * | 5/2020 | Jeffs | B62D 21/18 |
| 10,689,856 | B2 | * | 6/2020 | Jeffs | B60L 50/50 |
| 2007/0271761 | A1 | | 11/2007 | Haytayan | |
| 2021/0394316 | A1 | * | 12/2021 | Beldon | E04D 15/04 |

FOREIGN PATENT DOCUMENTS

| | | | | | |
|---|---|---|---|---|---|
| EP | 1405697 | A1 | | 4/2004 | |
| WO | WO 91/19061 | A1 | | 12/1991 | |
| WO | WO-2020112944 | A1 | * | 6/2020 | B23P 19/069 |

* cited by examiner

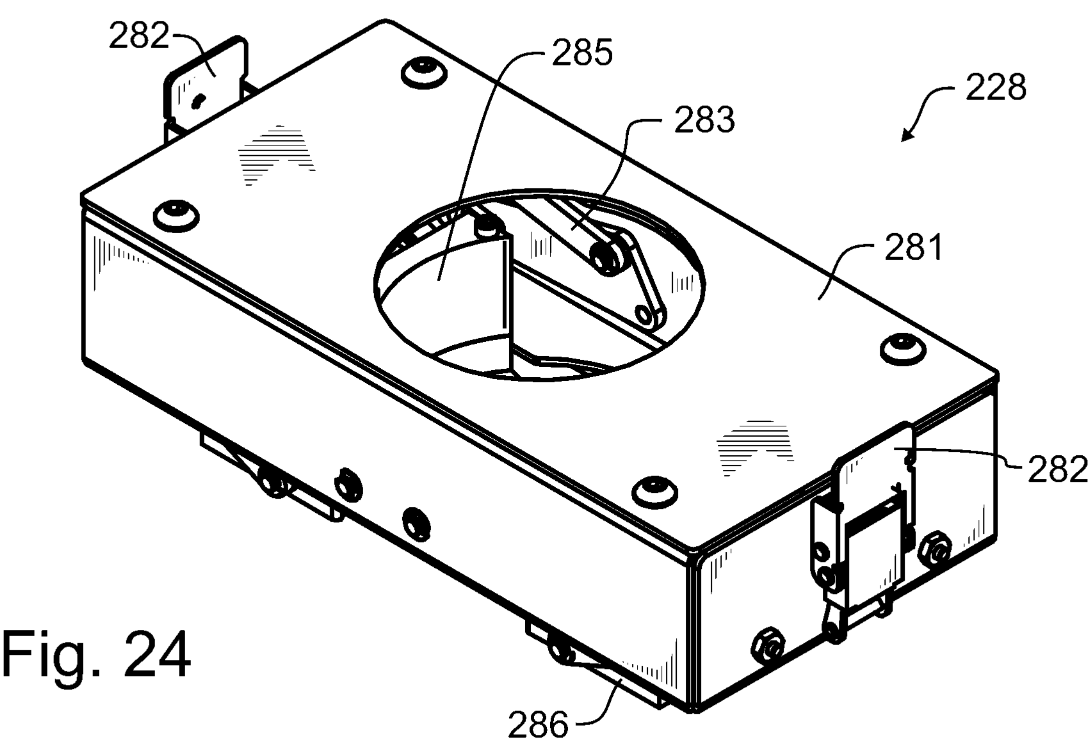
Fig. 24
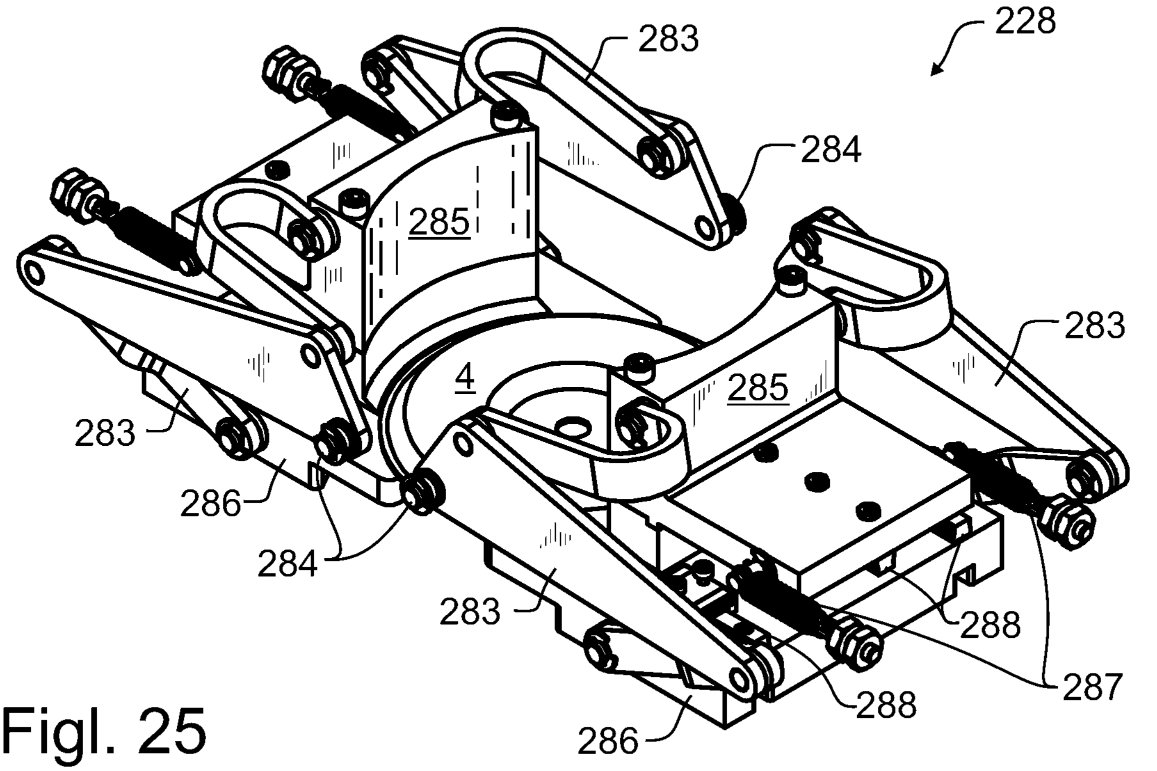
Figl. 25

COMMERCIAL ROOFING SCREW MACHINE

CROSS REFERENCE TO RELATED APPLICATIONS

The present application claims the benefit of U.S. provisional patent application 62/946,853 filed Dec. 11, 2019 of like title and inventorship, the teachings and entire contents which are incorporated herein by reference.

BACKGROUND OF THE INVENTION

1. Field of the Invention

The present invention pertains generally to the commercial construction industry, and more specifically to the construction and maintenance of a commercial roof. In a particular manifestation, the present invention provides an automated apparatus for attaching insulation and other materials to a commercial roof.

2. Description of the Related Art

Constructing a commercial roof is a labor intensive and time consuming process. Many industrial and commercial warehouses, shopping malls, office complexes, hospitals, and the like are very large, and for exemplary purpose can occupy tens of thousands of square feet, with some measured in the hundreds of thousands and even a few in the millions of square feet.

In addition to shear size, a typical commercial roof will also be constructed of a plurality of layers, for exemplary and non-limiting purpose such as tar or other bituminous materials, polymer or rubber sheets, insulation, and other beneficial materials. These layers are applied and in many but not all cases may be glued or otherwise adhered together and down to the roof structure. Commonly the insulation layers are affixed to the lower layers using screws and special washers in addition to being glued to provide more mechanical connection, rigidity, and immediate permanent physical connection to the roof, thereby preventing the otherwise lightweight insulation layer from shifting or blowing about. Similarly, various membranes may likewise be at least peripherally affixed with screws and special washers.

Not only are there a number of diverse construction steps required to build the roof, but with each step there comes one or more tasks that must be completed many times over. For exemplary and non-limiting purpose, a 32 square foot insulation panel might be fastened with eight well-spaced screw and washer pairs. While a single panel may be easily installed without error by most persons, for a 32,000 square foot roof the roofing installer will have to place 8,000 washers and drive 8,000 screws, one screw through each one of those washers. In addition, a roof installer must either be sure that every screw and washer is installed properly, both securely and in the right location, or they must install an excessive number of screws and washers to be sure that there will be enough fasteners functioning properly at all critical locations on the roof. Either way, the installation of these 8,000 screws is generally understood to be both monotonous and physically demanding while still requiring repeatable precision. As can be appreciated, repeatable precision is not easily achieved through the somewhat awkward installation of so many fasteners.

One of the issues with consistent installation is the challenge of properly placing the screws and washers, and subsequently knowing whether the fasteners are actually holding or if instead they stuck and bound before full installation, stripped, or broke off during installation. In some cases, and if not fixed, the nature of the flaw can lead to very costly premature roof failure. While a highly skilled journeyman roofer might immediately know whether the fastener is fully and properly installed, an apprentice might not. Consequently, not only is the job challenging owing to the great amount of repetitive labor, but also due to the experience required to distinguish proper installation from deficient.

Another challenge is that the fasteners are being installed at the feet of the installer. This means the installer must either bend down to roof surface level for each and every installation, or crawl about on the roof surface. Either way, there will be 8,000 repetitions required for the aforementioned roof.

Yet another challenge is the carrying of the large quantity of screws and washers, and the repetitive insertion of the screw into the washer, followed by the placement of the combination onto the roof, and the subsequent engagement of a drill with the screw head to drive the screw and washer pair into the roofing material. Once again, there will be 8,000 repetitions required for the aforementioned roof. In the prior art, this is also commonly associated with many spills of screws and washers and stripping of screw heads owing to incomplete engagement of the driver with the screw head.

Recognizing these challenges faced in commercial roofing, a number of artisans have devised equipment that reduces the effort required for proper screw and washer installation. Exemplary U.S. and foreign patents and published applications, the teachings which are incorporated herein by reference, include: U.S. Pat. No. 4,246,939 by Boegel, entitled "Automatic screw driving apparatus"; U.S. Pat. No. 5,056,684 by Beach et al, entitled "Roofing washer-dispensing machine"; U.S. Pat. No. 5,347,707 by Beach, entitled "Roofing washer-dispensing and fastener-driving machine"; U.S. Pat. No. 5,445,297 by Beach et al, entitled "Roofing washer-dispenser"; U.S. Pat. No. 5,555,780 by Beach et al, entitled "Roofing washer-dispensing and fastener-driving machine"; U.S. Pat. No. 5,673,816 by Larson et al, entitled "Roofing washer magazine for barbed roofing washers"; U.S. Pat. No. 5,819,609 by Habermehl, entitled "Collated screw strip with support surface"; U.S. Pat. No. 5,826,468 by Daubinger et al, entitled "Transporting device for a strip-shaped magazine feeding attachment for screws"; U.S. Pat. No. 5,921,454 by Larson et al, entitled "Roofing washer-dispensing and fastener-driving machine"; U.S. Pat. No. 5,960,678 by Kennedy, entitled "Automatic stress plate feeder"; U.S. Pat. No. 6,142,352 by Larson et al, entitled "Roofing washer-dispensing and fastener-driving machine"; U.S. Pat. No. 10,399,215 by DeFoe et al, entitled "Fastening tool for roofing fasteners with plate washers"; 2007/0271761 by Haytayan, entitled "Apparatus and method for fastening together structural components"; DE102005053575 by Zahn, entitled "Magazine tape for linked fastening elements"; EP1405697 by Lemontey, entitled "Apparatus for screwing in fastening elements"; and WO9119061 by Barnhard et al, entitled "Device for fastening web-, plat-, and/or profile-type components to a solid sub-structure".

These artisans have each provided vastly improved equipment over manual handling of screws, washers, and a basic handheld driver. With these improved machines, a roofer can walk about in a generally upright position and semi-automatically install each screw fastener and washer pair, typically with the simple actuation of a trigger.

However, among the challenges for this aforementioned installation machinery is the inability to handle diverse washer geometries, detect screw fastener mis-installation, efficiently reload screws and washers, and signal problems to the roofing installer. In addition, this machinery is manually controlled and repositioned, requiring the installer to judge where the proper location is for the next fastener pair installation. In light of the substantial size of many commercial and industrial roofs, and the lack of adequate machine control regarding either proper placement or proper installation, there still remains much opportunity for further improvement.

U.S. Pat. No. 6,755,334 by Ballent, entitled "Automatic nail fastening device", the teachings which are incorporated herein by reference, describes a multiple nailer for driving nails in distinct patterns, to thereby nail decking to a roof. In addition, when a sensor detects excessively thick metal plates, nails are not inserted. While also providing substantial benefit, the Ballent patent similarly lacks the ability to handle diverse washer geometries, detect and identify screw fastener mis-installation, efficiently reload screws and washers, and signal problems to a roofing installer.

Other more generic U.S. patents that describe multiple drivers for other applications, the teachings which are incorporated herein by reference, include: U.S. Pat. No. 3,757,613 by Arndt et al, entitled "Multiple screwing system"; U.S. Pat. No. 4,441,643 by Mccutchen, entitled "Pallet-forming apparatus"; U.S. Pat. No. 5,331,732 by Kvalheim, entitled "Hinge Applicator with gang screwdriving unit"; U.S. Pat. No. 6,918,322 by Biller, entitled "Multiple screw driving machine"; U.S. Pat. No. 7,681,311 by Kaminski, entitled "Routing of power and data from a voltage source to multiple electrically powered tools in a multi-tool processing station"; U.S. Pat. No. 8,141,236 by Fawzi et al, entitled "Ganged removal of component device cover screws"; U.S. Pat. No. 710,676 by Finn, entitled "Screw driving machine"; U.S. Pat. No. 2,303,726 by Dettloff et al, entitled "Golf Green Drill"; U.S. Pat. No. 3,848,488 by Weisenburger, entitled "Multispindle hand screwing device or brace"; U.S. Pat. No. 8,316,739 by Vollmuth et al, entitled "Screwdriving system with variably adjustable screwdriving spindles"; U.S. Pat. No. 8,020,626 by Francis et al, entitled "Torque wrench system having multiple torque stations"; U.S. Pat. No. 8,157,018 by Francis et al, entitled "Torque wrench system having multiple torque stations"; U.S. Pat. No. 8,347,972 by Francis et al, entitled "Torque wrench system having multiple torque stations"; and U.S. Pat. No. 8,640,780 by Francis et al, entitled "Torque wrench system having multiple torque stations". These multi- or ganged drivers provide examples of simple multiplication of the numbers of fastener drivers, but do not provide any teachings for a reliable implementation and identification of trouble areas.

Other U.S. patents that describe various automated building component fabrication techniques, the teachings which are incorporated herein by reference, include: U.S. Pat. No. 2,574,163 by Bamford, entitled "Mechanism for fabricating building sections"; U.S. Pat. No. 3,765,587 by Davis, entitled "Building construction machine"; U.S. Pat. No. 3,983,676 by Gilpin, entitled "Apparatus for automatically applying and securing roofing panels to the purlins of a building"; U.S. Pat. No. 6,742,245 by Glenn, entitled "Apparatus for assembly of roof panel structures"; U.S. Pat. No. 8,185,240 by Williams et al, entitled "Automated apparatus for constructing assemblies of building components"; U.S. Pat. No. 8,606,399 by Williams et al, entitled "Automated apparatus for constructing assemblies of building components"; U.S. Pat. No. 9,353,519 by Williams, entitled "Automated apparatus for constructing assemblies of building components"; and U.S. Pat. No. 10,189,176 by Williams, entitled "Automated apparatus for constructing assemblies of building components".

Exemplary U.S. patents that describe various torque limiters, the teachings which are incorporated herein by reference, include: U.S. Pat. No. 2,111,280 by Connell, entitled "Clutch mechanism"; U.S. Pat. No. 3,752,277 by Nakai, entitled "Torque clutch mechanism in an air wrench"; U.S. Pat. No. 4,154,308 by Eckman et al, entitled "Low torque automatic screwdriver"; U.S. Pat. No. 5,156,244 by Pyles et al, entitled "Torque sensing automatic shut-off and reset clutch for screwdrivers, nutsetters and the like"; U.S. Pat. No. 5,505,676 by Bookshar, entitled "Clutch torque control"; and U.S. Pat. No. 8,763,722 by Braun et al, entitled "Power tool having clutch device".

There is also an additional very large body of patents and associated technology surrounding general purpose robotic carts, also referred to as autonomous guided vehicles (AGV) or self-guided vehicles (SGV). Exemplary U.S. patents, the teachings which are incorporated herein by reference, include: U.S. Pat. No. 4,492,504 by Hainsworth, entitled "Material handling system"; U.S. Pat. No. 6,944,944 by Craythorn et al, entitled "Fastening machines"; U.S. Pat. No. 7,591,630 by Lert, Jr., entitled "Materials-handling system using autonomous transfer and transport vehicles"; U.S. Pat. No. 7,972,102 by Ward et al, entitled "Automated marine container terminal and system"; U.S. Pat. No. 7,980,808 by Chilson et al, entitled "Automatic transport loading system and method"; U.S. Pat. No. 7,991,505 by Lert, Jr. et al, entitled "Materials-handling system using autonomous transfer and transport vehicles"; U.S. Pat. No. 8,192,137 by Ross et al, entitled "Automatic transport loading system and method"; U.S. Pat. No. 8,210,791 by Chilson et al, entitled "Automatic transport loading system and method"; U.S. Pat. No. 8,529,187 by Ward et al, entitled "Automated marine container terminal and system"; U.S. Pat. No. 8,596,951 by Ward et al, entitled "Automated marine container terminal and system"; U.S. Pat. No. 8,784,034 by Lert, Jr., entitled "Materials-handling system using autonomous transfer and transport vehicles"; U.S. Pat. No. 8,845,266 by Ward et al, entitled "Automated marine container terminal and system"; U.S. Pat. No. 8,899,903 by Saad et al, entitled "vehicle base station"; and U.S. Pat. No. 9,834,380 by Hamilton et al, entitled "Warehouse automation systems and methods".

In addition, various artisans have developed various sensors and control systems useful for such exemplary purposes as machine vision, object detection, and navigation. Exemplary U.S. patents, the teachings which are incorporated herein by reference, include: U.S. Pat. No. 8,855,848 by Zeng, entitled "Radar, lidar and camera enhanced methods for vehicle dynamics estimation"; U.S. Pat. No. 8,855,849 by Ferguson et al, entitled "Object detection based on known structures of an environment of an autonomous vehicle"; U.S. Pat. No. 8,874,300 by Allard et al, entitled "Systems and methods for obstacle avoidance"; U.S. Pat. No. 8,874,371 by Troy et al, entitled "Beam directed motion control system"; U.S. Pat. No. 8,880,271 by Jeon, entitled "Robot cleaner and method for controlling the same"; U.S. Pat. No. 8,886,383 by Hyde et al, entitled "Automated systems, devices, and methods for transporting and supporting patients"; U.S. Pat. No. 8,886,385 by Takahashi et al, entitled "Autonomous mobile body and control method of same"; U.S. Pat. No. 8,897,917 by Tanaka et al, entitled "Autonomous mobile device"; and U.S. Pat. No. 8,897,947 by Nakano et al, entitled "Autonomous mobile device".

Additional U.S. patents of varying relevance, the relevant teachings and contents which are incorporated herein by reference, include: U.S. Pat. No. 8,874,360 by Klinger et al, entitled "Autonomous vehicle and method for coordinating the paths of multiple autonomous vehicles"; and U.S. Pat. No. 8,880,334 by Kini et al, entitled "Machine control system having autonomous edge dumping"; each that describe plural and simultaneous robots; U.S. Pat. No. 8,857,137 by Avnery, entitled "Robotic lawn mower for cutting around conveyance member"; U.S. Pat. No. 8,868,301 by Self et al, entitled "Determination of remote control operator position" that describes diverse issues w/autonomous vehicles; U.S. Pat. No. 8,892,294 by Waltz et al, entitled "Vehicle control limits" that describes many issues with checking autonomous vehicle status; and U.S. Pat. No. 5,081,815 by Carnell, entitled "Mechanized Shingle applying apparatus"; U.S. Pat. No. 5,197,257 by Nietling, entitled "Apparatus for applying shingles to a roof"; and U.S. Pat. No. 5,205,103 by Burton, entitled "Shingle laying apparatus"; each that describe shingle laying apparatuses.

As may be apparent, in spite of the enormous advancements and substantial research and development that has been conducted, there still remains a need for an improved commercial roofing screw machine that can automatically properly place and install every screw and washer pair, both securely and in the right location, or provide clear indicia where an installation failed.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a commercial roofing screw machine. A conveyance is configured to move the screw machine about a roof. At least one sensor is operative to distinguish roofing subfloor grooves and gaps from elevated attachment surfaces. A plurality of screw machine modules are configured to each simultaneously drive roofing washers and screws through a roofing layer into the elevated attachment surface and thereby affix the roofing layer to the elevated attachment surface. The conveyance and at least one sensor are cooperative to align each of the plurality of screw machine modules to misalign with the subfloor grooves and gaps during the simultaneous driving of roofing washer and screw through the roofing layer into the elevated attachment surface.

OBJECTS OF THE INVENTION

Exemplary embodiments of the present invention solve inadequacies of the prior art by providing an improved commercial roofing screw machine having: a plurality of screw guns that each properly place and install screw and washer pairs, both securely and in the right location, from separate magazines; automated operation with automatic or manual fastening pattern selection; sensors to recognize insulation sheets or marking lines, the high and low rib on the decking through the insulation, and torque; an indicia generator that marks fastener locations that did not hold correctly; and wireless communications for remote status checks, new programming uploads, troubleshooting, issue and error reporting, communicating with like or complementary machines to complete tasks, communicating with a records and reporting system to document fasteners installed correctly and which ones failed and were fixed by humans, and other beneficial purpose, and enabling plans upload with feature locations identified to select a fastening pattern based on location on a building and wind uplift ratings.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide an improved commercial roofing screw machine that can automatically properly place and install screw and washer pairs, both securely and in the right location, or provide clear indicia where an installation failed. As a corollary thereto, another object of the invention is to enable a roofer to walk about in a generally upright position while the improved commercial roofing screw machine automatically installs each screw fastener and washer pair, only needing to address roof-level screw fastener and washer pairs that fail to properly automatically install. An additional corollary thereto is to provide a sensor suitable to recognize the high and low ribs on roof decking through the insulation, and to place and install screw and washer pairs responsive thereto. As a further corollary thereto, another object of the invention is to detect and mark when fault conditions arise, including but not limited to knowing whether the screw and washer are both present, and whether the fastener pairs are actually holding or if instead they stuck before full installation, stripped, or broke off during installation. In some embodiments, a torque sensor is provided with each driver, the torque sensor monitored and driver controlled to stop when a certain torque is reached or when a fastener does not take hold. In some embodiments, a spray marker provides visible indication of a fastener that requires human intervention. An additional object of the invention is to provide screw and washer magazine supplies that will provide reasonable operating time, which will readily accommodate diverse screw and washer geometries, and that can be efficiently reloaded. Another object of the present invention is to insert a screw through a washer before driving the fastener pair into a workpiece. A further object of the invention is to provide a sensing system such as optical sensors to detect the outline of roofing insulation and then install screw and washer pairs to a certain pattern. Yet another object of the present invention is to provide a means to manually choose ones of different fastening patterns. An additional object of the invention is to provide location awareness using line following, GPS, or other position-determining apparatus. A further object of the invention is to provide wireless communications such as WiFi, Bluetooth™, or other known techniques to enable remote status checks, new programming uploads, troubleshooting, issue and error reporting, and the like. Desirably, a commercial roofing screw machine is configured to use such wireless communications to: communicate with like or complementary machines to complete tasks; communicate with a records and reporting system to document fasteners installed correctly and which ones failed and were fixed by humans, and other beneficial purpose; and enable an upload of plans with feature locations identified, thereby enabling a preferred commercial roofing screw machine to change fastening pattern based on location on a building and wind uplift ratings.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 24 illustrates the second embodiment washer storage magazine of FIG. 23 from an isometric view with the vertical storage rack removed for illustrative purposes.

FIG. 25 illustrates the second embodiment washer storage magazine of FIG. 23 from an isometric view with the vertical storage rack and outer housing removed for illustrative purposes.

DESCRIPTION OF THE PREFERRED EMBODIMENT

Figure 5:
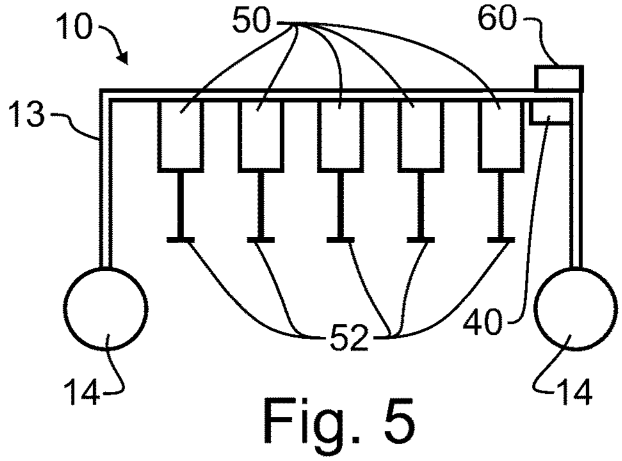
FIG. 5 illustrates a preferred embodiment commercial roofing screw machine designed in accord with the teachings of the present invention and substantially simplified to show the critical components from a schematic side elevational view.

Manifested in the preferred embodiment, the present invention provides a commercial roofing screw machine 10 designed in accord with the teachings of the present invention and illustrated in schematic form in FIG. 5. Preferred embodiment commercial roofing screw machine 10 secures insulation 1 to a roof substructure attachment surface 7. The present invention is designed to remove a substantial portion of the time consuming process of attaching insulation 1 to the roof, and eliminate misses where the screws 5 are misplaced. To navigate the roof, preferred embodiment commercial roofing screw machine 10 is most preferably location-aware, for exemplary and non-limiting purpose fitted with GPS (Global Position System) and other sensors. Through the detection of roof features, preferred embodiment commercial roofing screw machine 10 is configured to autonomously attach screws 5 and washers 4 to the roof.

For the purposes of the present disclosure, it will be understood that references herein to screws will be understood to be defined as including all suitable fasteners, but with preferred embodiments specifically implemented with screws. Similarly, references herein to washers and roofing washers will be understood herein to be defined as including similar apparatus, sometimes for exemplary and non-limiting purpose referred to as plates and by other monikers, whether or not identical or similar in either appearance or function.

Most preferably, preferred embodiment commercial roofing screw machine 10 is capable of automatically and correctly installing a multitude of roofing fasteners into roof underlayment such as wood or corrugated steel; has the ability to be mounted on a cart in a variety of fastener patterns; will feed and install multiple fasteners and washers before reloading; is easy to load with fasteners and washers; will detect and mark incorrectly installed fasteners; will provide increased productivity and reduction of user fatigue; and will have simple methods of operator interaction.

Figure 1:
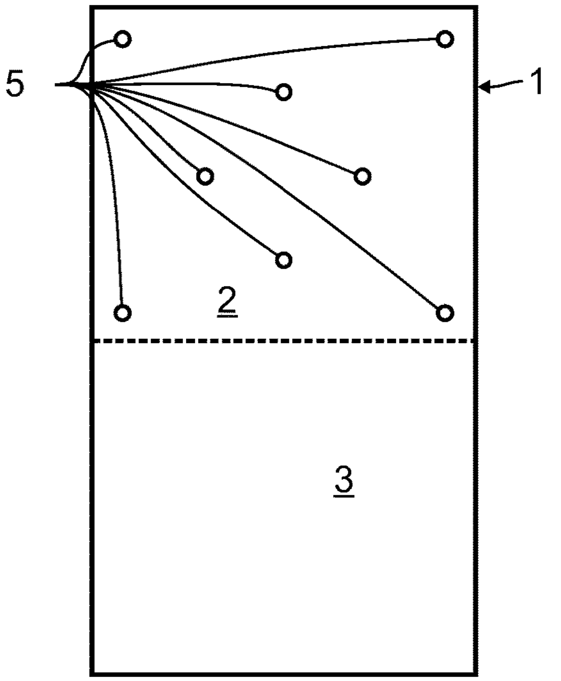
FIG. 1 illustrates the results of a single actuation of a preferred embodiment commercial roofing screw machine designed in accord with the teachings of the present invention with screw and washer pairs inserted into a sheet of insulation.
Figure 2:
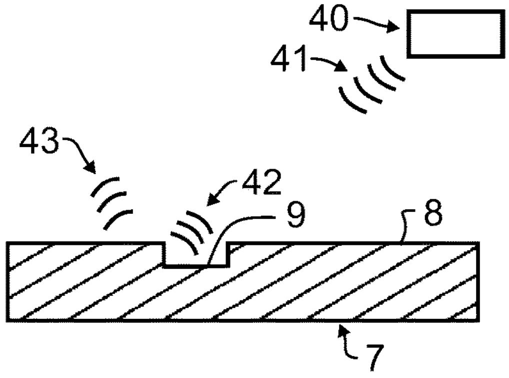
FIG. 2 illustrates a preferred embodiment surface detection sensor apparatus for identifying channels and irregularities in the subsurface such as is used in a preferred embodiment commercial roofing screw machine designed in accord with the teachings of the present invention.
Figure 3:
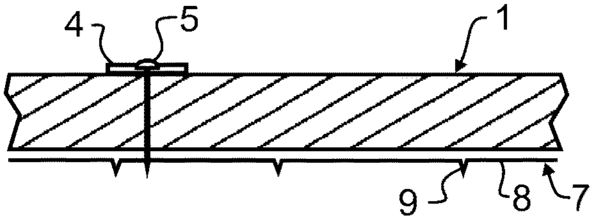
FIG. 3 illustrates one resultant screw and washer pair attachment of FIG. 1 from a side sectional view.
Figure 4:
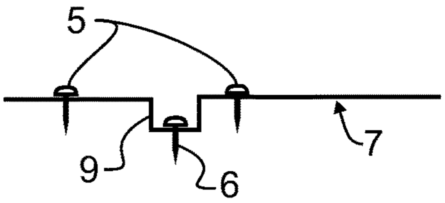
FIG. 4 illustrates an erroneous screw attachment from a side sectional view.

In the preferred embodiment, ultrasonic transceiver 40 detects and identifies the shape of attachment surface 7 underlayment, such as wood or corrugated steel, and uses guidance system 60 to properly position screw machine modules 50. When ultrasonic transceiver 40 and guidance system 60 indicate proper position, independent screw drive motor assemblies 51 are actuated to drive screws 5 into attachment subsurface 7 through insulation 1. Since insulation 1 shown in FIG. 1 has a rectangular sheet geometry, which is common in the market, when preferred embodiment commercial roofing screw machine 10 actuates the various screw machine modules 50 it employs a pattern which can be repeated in whole or part. FIG. 1 shows the preferred attachment pattern shown on attached portion of insulation sheet 2, which may be repeated in part or in whole on unattached portion of insulation sheet 3.

In the preferred embodiment of the invention illustrated in FIG. 5, preferred embodiment commercial roofing screw machine 10 has at least one and preferably a plurality of independent screw machine modules 50 with screwing heads 52 which are held in place by frame 13 and moved on carriage 14. Preferred embodiment commercial roofing screw machine 10 is guided around the roof via guidance system 60 which directs the movement of carriage 14.

Preferred embodiment commercial roofing screw machine 10 anchors insulation 1 to the attachment subsurface 7 using screws 5. In most applications, screws 5 are paired with washers 4. To prevent driving a misplaced screw 6 into a valley or groove 9, the attachment subsurface 7 is scanned. An ultrasonic transceiver 40 or other comparable means distinguishes elevated attachment surface 8 from dropped or grooved attachment surface 9, and in combination with guidance system 60 thereby avoids inserting screws 5 into dropped attachment surface 9. Ultrasonic transceiver 40 sends out an ultrasonic pulse 41 which strikes attachment surface 7 and the ultrasonic reflection 43 or ultrasonic bounce back 42 are detected by ultrasonic transceiver 40 to identify difference between elevated attachment surface 8 and dropped attachment surface 9. In the most preferred embodiment, ultrasonic transceiver 40 can distinguish between elevated and dropped attachment surfaces 8, 9 when insulation 1 is on top of attachment surface 7. Using the information garnered from ultrasonic transceiver 40, guidance system 60 will position screw machine modules 50 to avoid a misplaced screw 6.

When preferred embodiment commercial roofing screw machine 10 actuates one or more of the plurality of independent screw machine modules 50, the associated screwing heads 52 push down on a screw 5 thereby forcing the screw into insulation 1 and into attachment surface 7. Rotation from independent screw machine module 50 advances screw 5 through the rotation of the screw 5 helical thread. Independent screw machine module 50 has a torque based clutch mechanism to prevent over-tightening of screw 5, and from advancing screw 5 too deep into or through insulation 1. Most preferably suitable sensors are provided such as torque and force sensors to detect out-of-parameter conditions, such as zero or exceptionally low torque indicating a broken or stripped fastener, excessive downward force indicative of a screw not properly screwing into the insulation or subsurface, and the like. When such out of parameter conditions are detected, a marking system such as marking system 245 described herein below may be provided to generate suitable indicia of a potentially defective installation. For exemplary and non-limiting purpose, such indicia might include a brightly colored spray mark on the surface of insulation 1 or washer 4.

Preferred embodiment commercial roofing screw machine 10 is supported by carriage 14 which is driven by a motor. The motor may comprise any suitable type or number of motive power sources, including for exemplary and non-limiting purpose an internal combustion engine, external combustion engine, an electrical motor, or electric motors coupled to one or more of the wheels. The drive may be direct, particularly in the case of a plurality of electric motors, but will more typically include suitable transmission means either provided within the motor or intermediate between motor and carriage 14. For exemplary and non-limiting purpose, suitable transmission means may include not only gearing but also differentials, and may be provided to either one or any number of wheels, as desired and appropriate at design time. Furthermore, the individual wheels of carriage 14 in some embodiments may be individually supported and driven, and in other embodiments may be coupled together on common axles.

Most preferably, carriage 14 will comprise wheels that are relatively large, both in diameter and in width. The large diameter will more readily permit carriage 14 to traverse any small obstacles, and the width will increase the surface area supporting the weight of preferred embodiment commercial roofing screw machine 10 over the edges of insulation 1 to reduce the chance of damage or deformation. While pneumatic wheels are preferred since they are generally less likely to damage the roof, in some alternative embodiments solid wheels may be provided, and in other alternative embodiments tracks similar to those used on some skid-steers, bulldozers, and tanks may be provided instead of wheels. In other alternative embodiments, other known apparatus for supporting and propelling carriage 14 may be provided instead of wheels or tracks.

To accommodate the borders, vents, and other obstacles on the roof, guidance system 60 will access one or more location transmitters, such as GPS, to determine current location and respond to direct the movement of preferred embodiment commercial roofing screw machine 10 and control the application of screws 5 and washers 4. Sensors will preferably include apparatus capable of distinguishing areas which have insulation 1 laid from areas to be covered, and also capable of detecting and identifying obstacles such as the roof parapets, HVAC apparatus, vents, skylights and other roof penetrations, and the like. A suitable system may for exemplary and non-limiting purpose comprise a computer vision system using visible light and appropriate software to detect and identify insulation 1, various roof features, and obstacles. However, in alternative embodiments, other types of sensors may be provided in addition or instead of a vision system. Again, for exemplary and non-limiting purpose an ultrasonic detector may be used to identify obstacles and assist with navigation. In further alternative embodiments, the roof geometry may be known and mapped, and navigation controlled responsive to a map stored within memory provided within or in addition to guidance system 60. Such a navigation system may preferably be provided within preferred embodiment commercial roofing screw machine 10, but in alternative embodiments may be housed separately therefrom. Where a map and navigation system is used, guidance system 60 may very simply guide preferred embodiment commercial roofing screw machine 10 about the roof. In such instance, input from sensors may be used to confirm positions anticipated by guidance system 60, such as when approaching or moving adjacent to a parapet. Where a map is provided and used directly by guidance system 60, the map may be retrieved from another device or apparatus and transferred through suitable communications to guidance system 60 for storage.

In order to provide map-based navigation, and whether the navigation is controlled entirely within preferred embodiment commercial roofing screw machine 10 or by apparatus external thereto, a communication channel is required. Exemplary communications might for exemplary and non-limiting purpose comprise wireless techniques such as Bluetooth™ wireless communications, Near-Field Communications (NFC), and other radio or optical communications, or direct electrical connections such as through a USB or other wired connection. Wireless techniques are most preferred, owing to the ready availability, low cost, and need for a durable communications channel even in the presence of obstacles.

When a communications channel is provided and a sensor contained within guidance system 60 comprises a computer vision system, video from guidance system 60 may be transmitted from preferred embodiment commercial roofing screw machine 10 to a separate device. This may preferably be configured to enable a person to remotely monitor the movements of preferred embodiment commercial roofing screw machine 10 and to view the video from guidance system 60. This combination greatly facilitates remote monitoring of the proper operation and progress of preferred embodiment commercial roofing screw machine 10. In addition, and where desired, preferred embodiment commercial roofing screw machine 10 may further be provided with suitable audio and visual notification apparatus to signal when preferred embodiment commercial roofing screw machine 10 is moving. Such notification apparatus may for exemplary and non-limiting purpose comprise an electronic bell or chime and a light, the light which may be illuminated or flashed and the bell which may be sounded when preferred embodiment commercial roofing screw machine 10 is moving.

In some instances, a GPS unit may be provided within guidance system 60. In such instance, a map may be provided in advance in association with GPS coordinates, or the map may be generated if not pre-existing. In these instances where a GPS unit is provided, the precision of detected GPS position may be improved through the use of a differential GPS system, where a fixed GPS position detector is provided in the vicinity of and in communication with preferred embodiment commercial roofing screw machine 10 to compare position information therewith. It is known that GPS and other satellite systems are subject to both accidental and intentional drift and variation. When a fixed position receiver is used near to preferred embodiment commercial roofing screw machine 10, then a sudden shift detected by both preferred embodiment commercial roofing screw machine 10 and the fixed position receiver will be used to determine that there was, in fact, no such shift (the fixed position receiver has not moved).

When preferred embodiment commercial roofing screw machine 10 is provided with GPS unit in guidance system 60 and a suitable communications apparatus, more than one preferred embodiment commercial roofing screw machine 10 may be operated upon a single roof. In such instance, each one of preferred embodiment commercial roofing screw machines 10 will preferably communicate with others, for exemplary purposes to communicate which area(s) still require insulation such that when one preferred embodiment commercial roofing screw machine 10 fully discharge its battery capacity, washers 4, or screws 5, another preferred embodiment commercial roofing screw machine 10 may be advised where to travel to continue the process of installing insulation 1, by providing suitable GPS coordinates and/or other information.

In some embodiments, guidance system 60 may be enabled to follow a line. The line may be generated using any suitable technology, and so may be a visually discernable line such as created by a paint sprayer, an electrical line, a laser or other light generator whether in the visible or invisible spectrum, or any other suitable means. To be clear, in this context the line does not have to be linear, and is instead understood to imply a path, whether linear or otherwise. In some embodiments, the line may be generated or provided when insulation 1 is placed onto attachment surface 8. In other embodiments, the edge of insulation 1 may provide sufficient distinction to be identifiable as a line by guidance system 60.

Detection of presence or absence of washers 4 and screws 5 within screw machine module 50 may be done, by exemplary and non-limiting purpose, using suitable sensors include an ultrasonic or optical detector which will detect either a void or presence of a screw, a sonic sensor detecting movement screws, a weight or pressure sensor detecting the force from the weight of the washers 4 and screws 5, or other suitable sensor(s).

From the foregoing figures and description, several additional features and options become more apparent. First of all frame 13 may be manufactured from a variety of materials, including metals, resins and plastics, or combinations or composites of the above. The specific material used may vary, though special benefits are attainable if several important factors are taken into consideration. First, frame 13 is preferably durable, light weight, and resilient. By using resilient materials, there is a dampening of the forces imparted by the independent screw machine modules 50, thereby helping to ensure that screws 5 get placed where they are intended to be. When the internal clutches within the independent screw machine modules 50 activate, the jarring motion will be dampened to the other independent screw machine modules 50 as the jarring motion is transmitted though frame 13. Furthermore, it is preferable that all materials are sufficiently tough and durable to not fracture, even when great forces are applied thereto. In the case of frame 13, one preferred material is steel, which has the advantages of being highly resilient to impacts, but suffers from having higher weights. An alternative material is aluminum, which has the advantages of being light weight, and strong, but has higher associated costs. Yet another alternative material is Ultra-High Molecular Weight (UHMW) polyethylene, which has the advantages of being extremely tough and durable to withstand great force, scuff resistant, and light weight compared to its strength.

Various embodiments of apparatus designed in accord with the present invention have been illustrated in the various figures. The embodiments are distinguished by the hundreds digit, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

Figure 6:
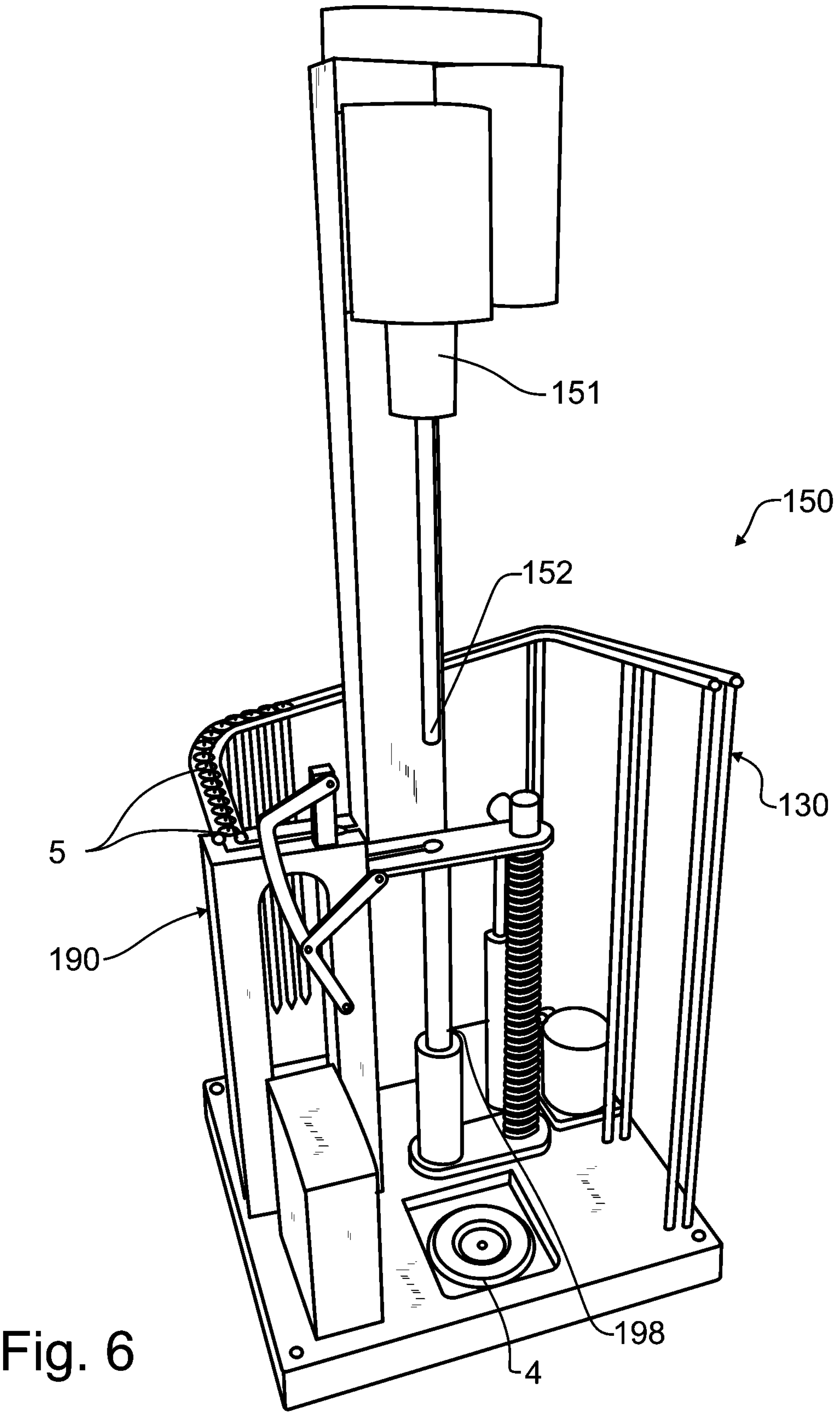
FIG. 6 illustrates a first embodiment screw drive that may for exemplary purpose be used in the preferred embodiment commercial roofing screw machine of FIG. 5 in accord with the teachings of the present invention.

FIG. 6 illustrates in greater detail a screw machine module 150 that may for exemplary purpose in accord with the teachings of the present invention be used in preferred embodiment commercial roofing screw machine 10 to replace schematically illustrated screw machine modules 50.

A fastener storage system 130 allows screws 5 to slide in a single file circuitous path supported by the fastener head upon parallel rails, eventually coming into position for the screw feed assembly 90 to position a single screw, as required. At the base of second embodiment screw machine module 150 is a washer 4 through which a screw 5 will ultimately pass.

Figure 7:
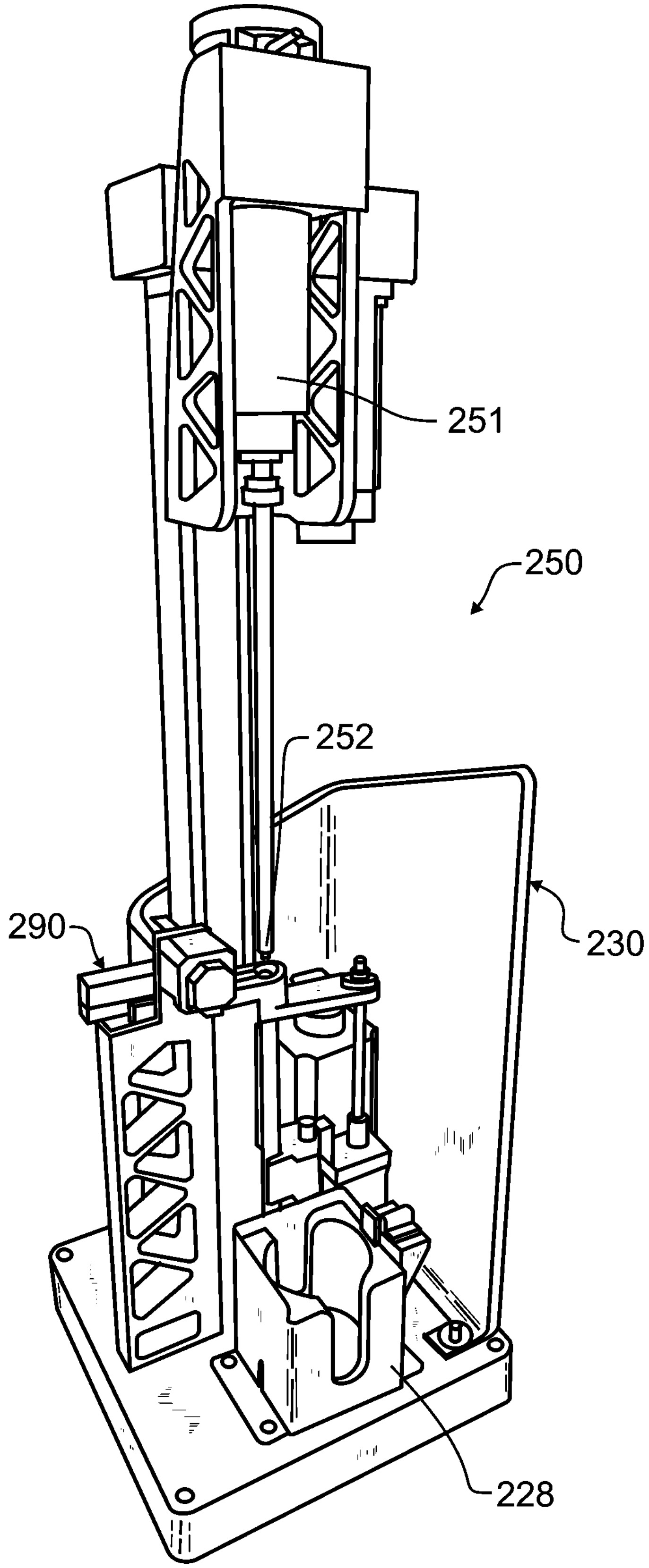
FIG. 7 illustrates a second embodiment screw machine module that may for exemplary purpose be used in the preferred embodiment commercial roofing screw machine of FIG. 5 in accord with the teachings of the present invention.

FIG. 7 illustrates a second embodiment screw machine module 250 that may for exemplary purpose be used in preferred embodiment commercial roofing screw machine 10 to replace schematically illustrated screw machine modules 50. In this case, fastener storage system 230 has solid walls, and a washer storage system 228 is provided at the base.

Figure 8:
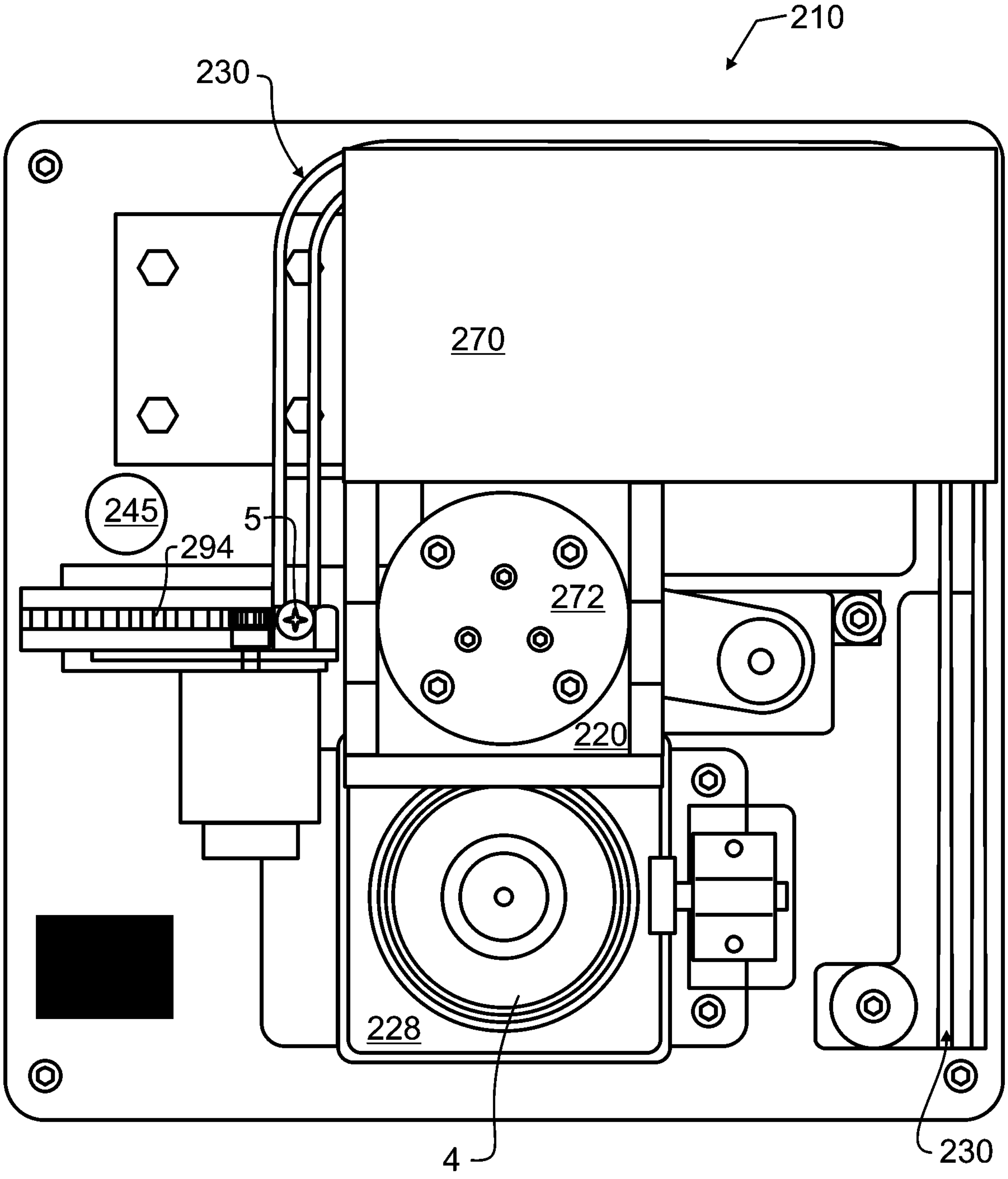
FIG. 8 illustrates the various subsystems that are incorporated into a preferred embodiment commercial roofing screw machine module designed in accord with the teachings of the present invention.

FIG. 8 illustrates various subsystems that are incorporated into the screw machine in accord with the teachings of the present invention. As evident therein, in addition to the various storage, handling and installation components, each discussed elsewhere, there is also a fastener installation system 270 such as used to drive screws 5, an installation monitoring system 272, and marking system 245 that marks suspect or failed fastener installations.

The installation monitoring apparatus 272 illustrated in FIG. 8 will preferably comprise some combination of suitable sensors such as torque and force sensors to detect out-of-parameter conditions, such as zero or exceptionally low torque indicating a broken or stripped fastener, excessive downward force indicative of a screw not properly screwing into the insulation or subsurface, and the like. When such out of parameter conditions are detected, marking system 245 is preferably provided to generate suitable indicia of a potentially defective installation. For exemplary and non-limiting purpose, such indicia might include a brightly colored spray mark on the surface of insulation 1 or washer 4.

Figure 9:
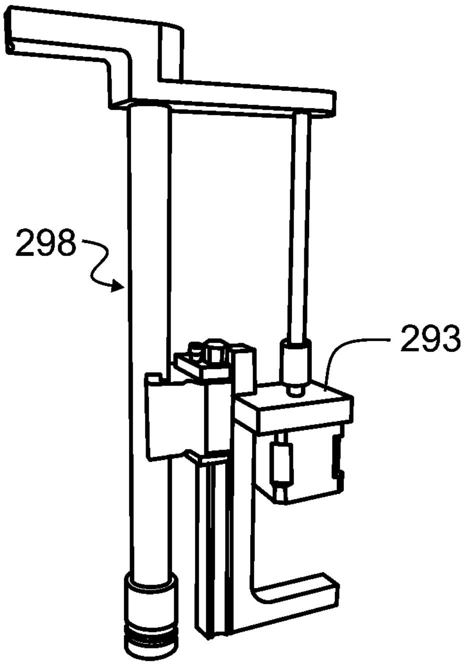
FIGS. 9-11 illustrate a first embodiment of a fastener positioning system that may for exemplary purpose be used in the preferred embodiment commercial roofing screw machine of FIG. 7 in accord with the teachings of the present invention.
Figure 10:
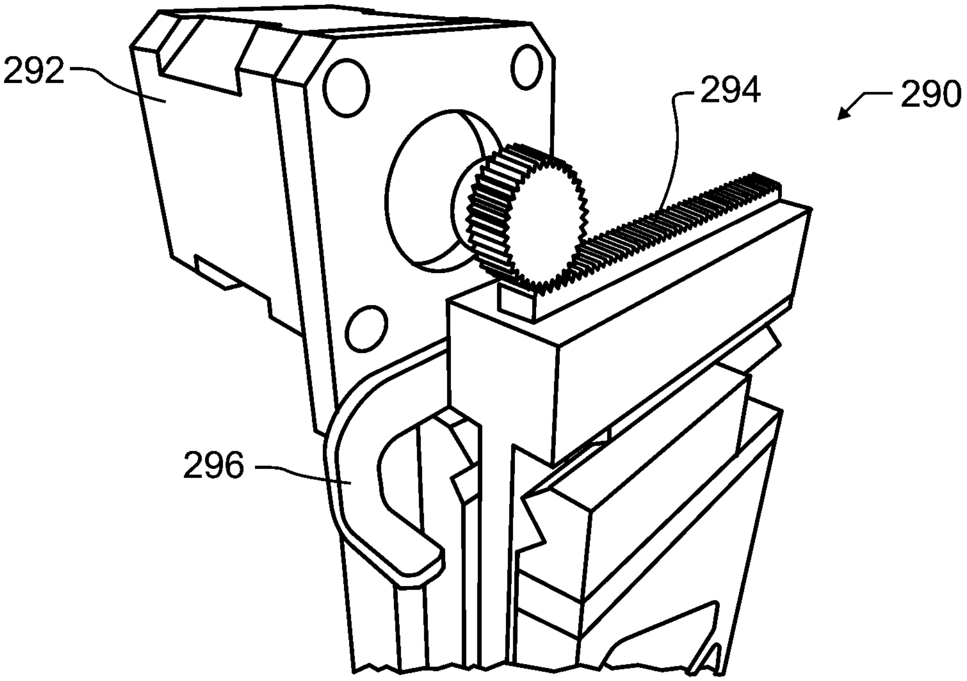
Figure 11:
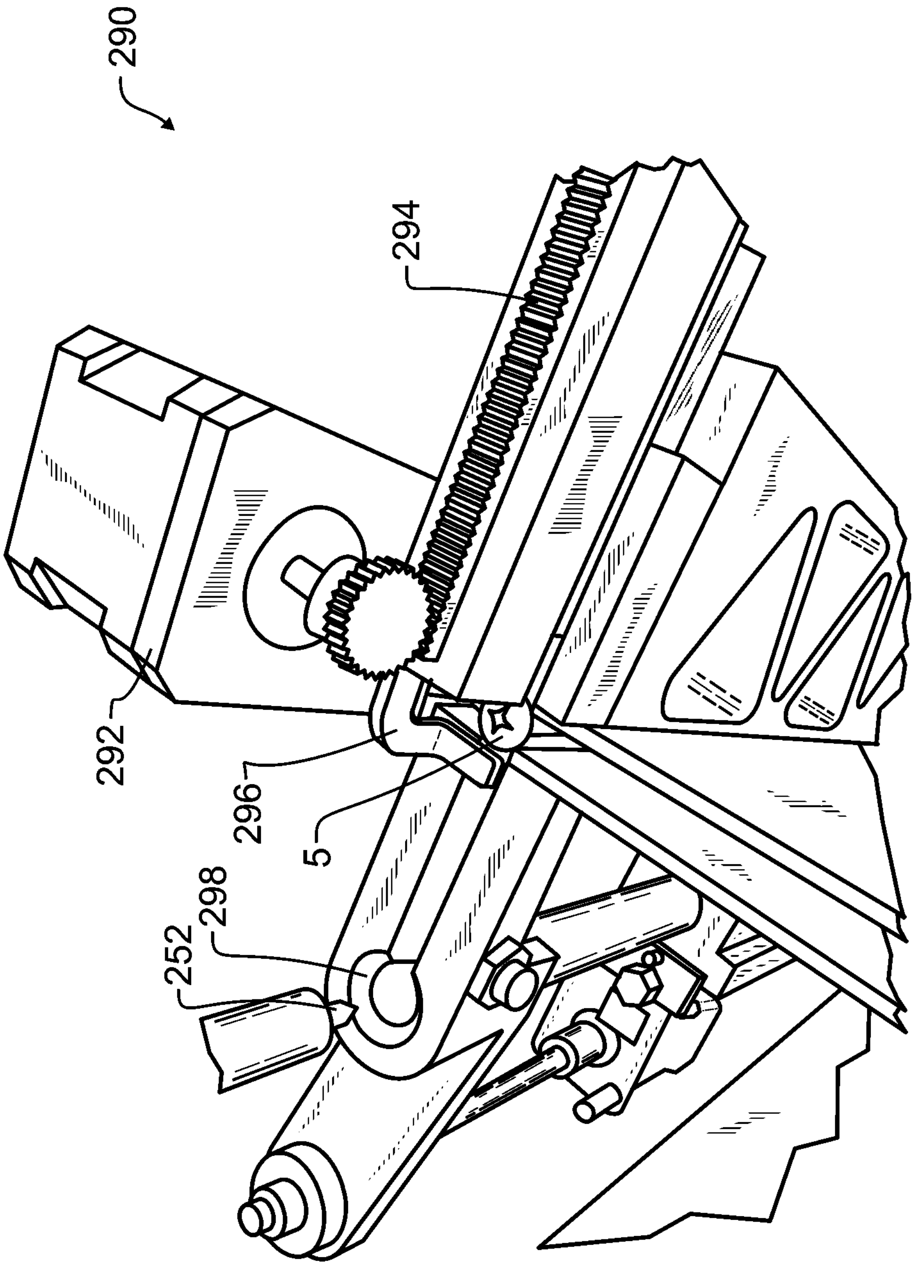

FIGS. 9-11 illustrate a first embodiment of a fastener positioning system that may for exemplary purpose be used in second embodiment screw machine module 250 in accord with the teachings of the present invention. As particularly evident from FIG. 11, screw feed assembly 290 includes a screw advancement motor 292 that turns a pinion gear, which in turn drives screw advancing block or rack 294 when a new screw 5 is desired. This rack 294 and associated pinion gear transfers fasteners such as screws 5 from track to feed tube in a simple and cost effective manner. The screw advancing stop 296 and screw drop tube 298 align and receive screws 5. A forward tab is provided that keeps screws 5 from pushing further down toward screw drop tube 298 due to their weight. The translating feed tube allows for support of fastener during installation to prevent yawing and incorrect installation. This eliminates need for an excessively long driver tip extension. In addition, a magnetic feed tube end ensures that washer 4 stays in correct position. The motor 293 is preferably a stepper motor that allows for rapid and precise positioning of the feed tube. A linear bearing provides a simple method of grounding forces active on feed tube, and is both precise and readily available. Expanding support jaws support the fastener during installation to prevent yawing.

Figure 12:
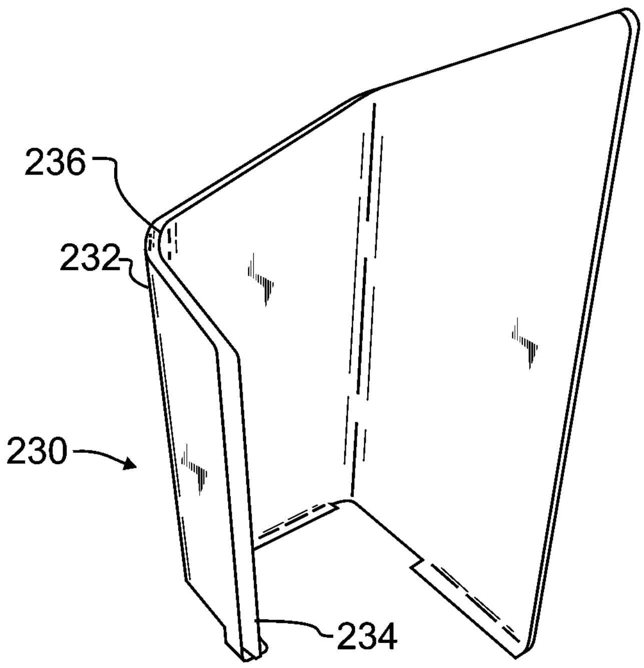
FIGS. 12-13 illustrate a first embodiment of a fastener storage system that may for exemplary purpose be used in the preferred embodiment commercial roofing screw machine of FIG. 5 in accord with the teachings of the present invention.
Figure 13:
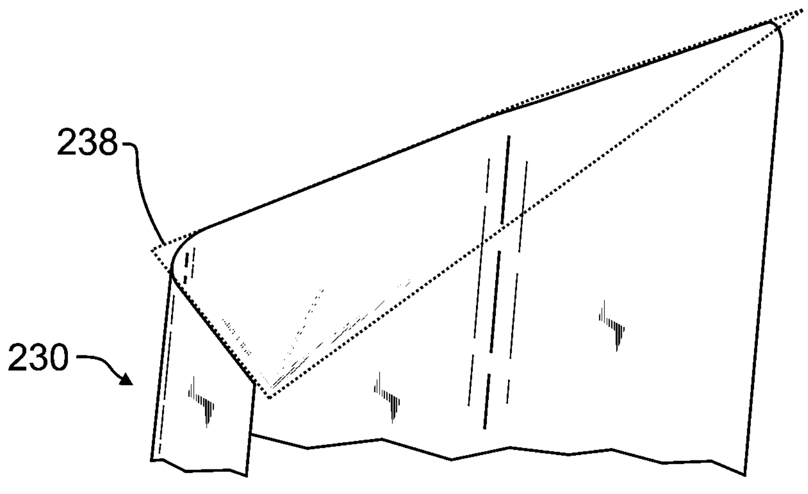

FIGS. 12-13 illustrate a first embodiment of a fastener storage system that may for exemplary purpose be used in second embodiment screw machine module 250 such as illustrated in FIG. 7. Fastener storage system 230 includes an outside track wall 232, an inside track wall 234, a track 236 defined by walls 232, 234, and a slope plane 238 that defines the feed slope to cause the fasteners to feed continuously. The sheet metal track provides efficient use of space, shields the fasteners against disruptive impact (such as from debris) during machine operation, is simple to construct, and of low cost.

Figure 14:
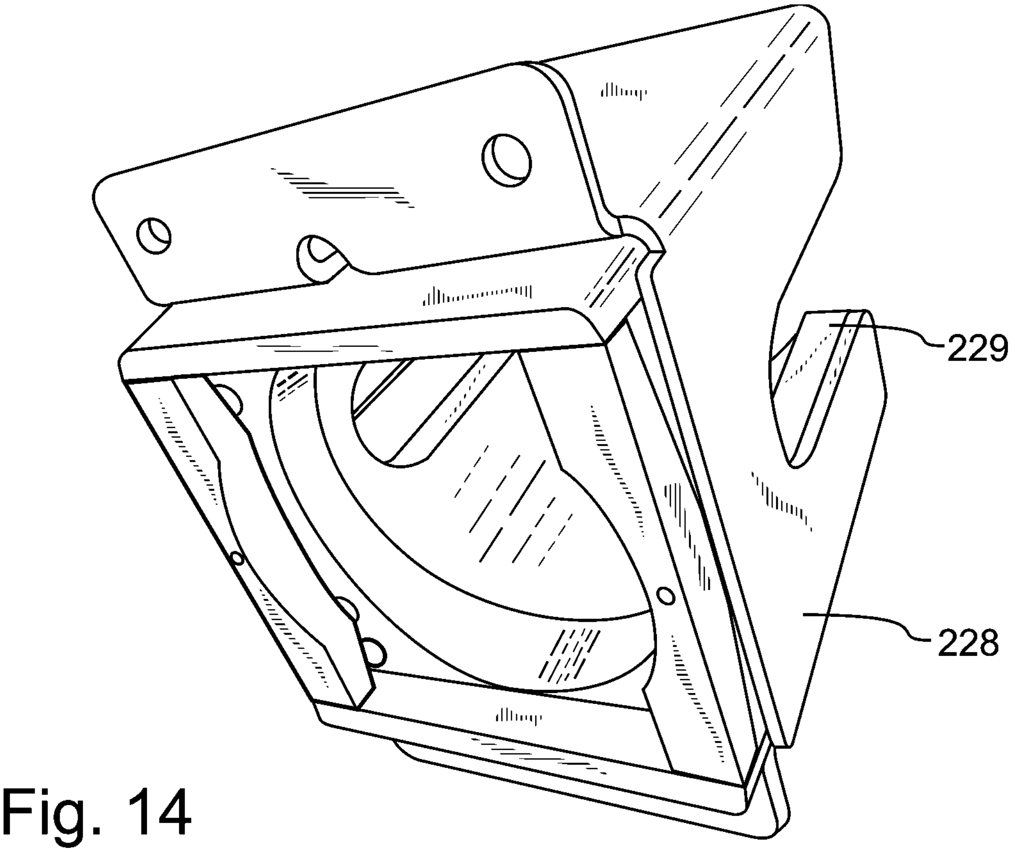
FIGS. 14-15 illustrate a first embodiment of a washer storage system that may for exemplary purpose be used in the preferred embodiment commercial roofing screw machine of FIG. 5 in accord with the teachings of the present invention.
Figure 15:
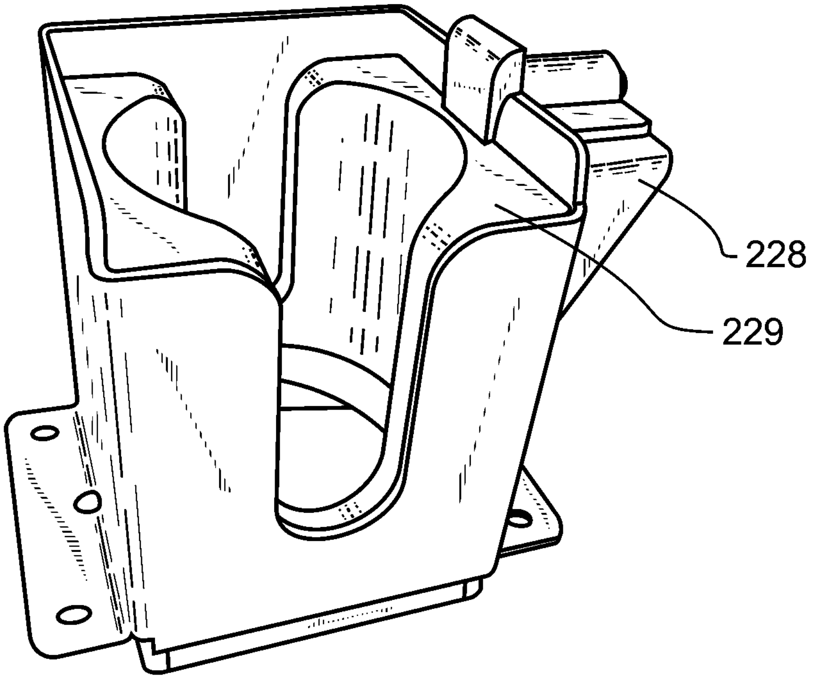

FIGS. 14-15 illustrate a first embodiment of a washer storage system 228 that may for exemplary purpose be used in second embodiment screw machine module 250 such as illustrated in FIG. 7, in accord with the teachings of the present invention. Washer storage system 228 is provided with easily removable polymer magazine inserts 229 that can be sized to accommodate different washer geometries. This allows for rapid changeover to different washer plates 4, and is of low cost to fabricate. Most preferably, the magazine inserts are also symmetrical, which removes possibility of operator error when performing a system changeover.

Figure 16:
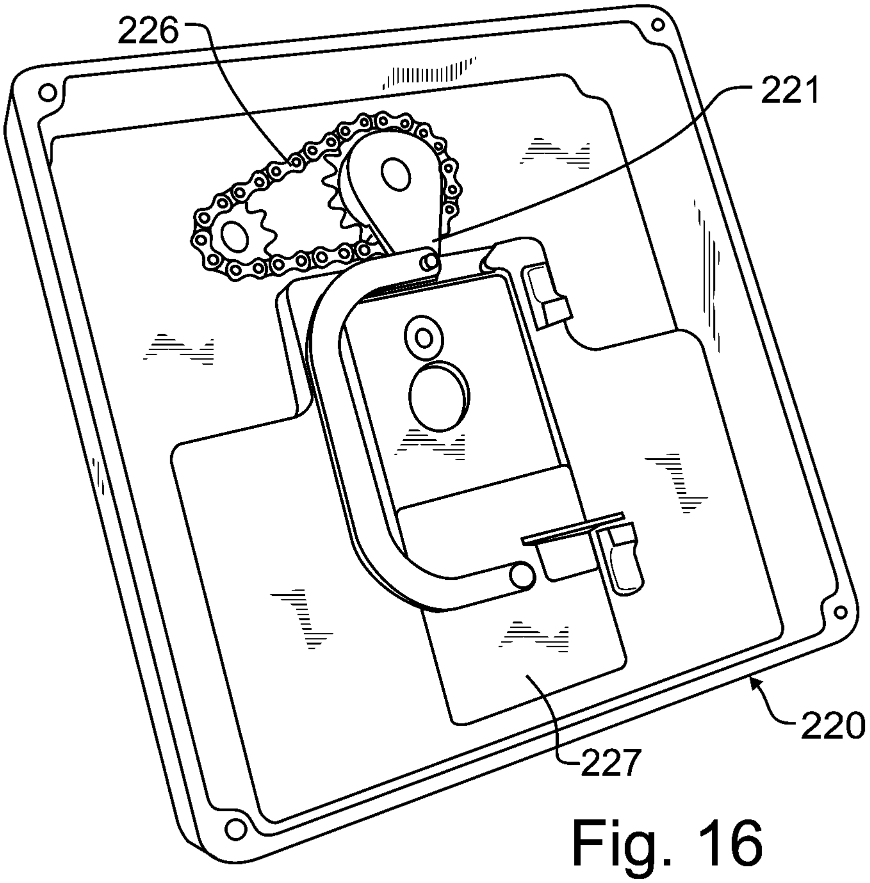
FIGS. 16-17 illustrate a first embodiment of a washer transfer system that may for exemplary purpose be used in the preferred embodiment commercial roofing screw machine of FIG. 5 in accord with the teachings of the present invention.
Figure 17:
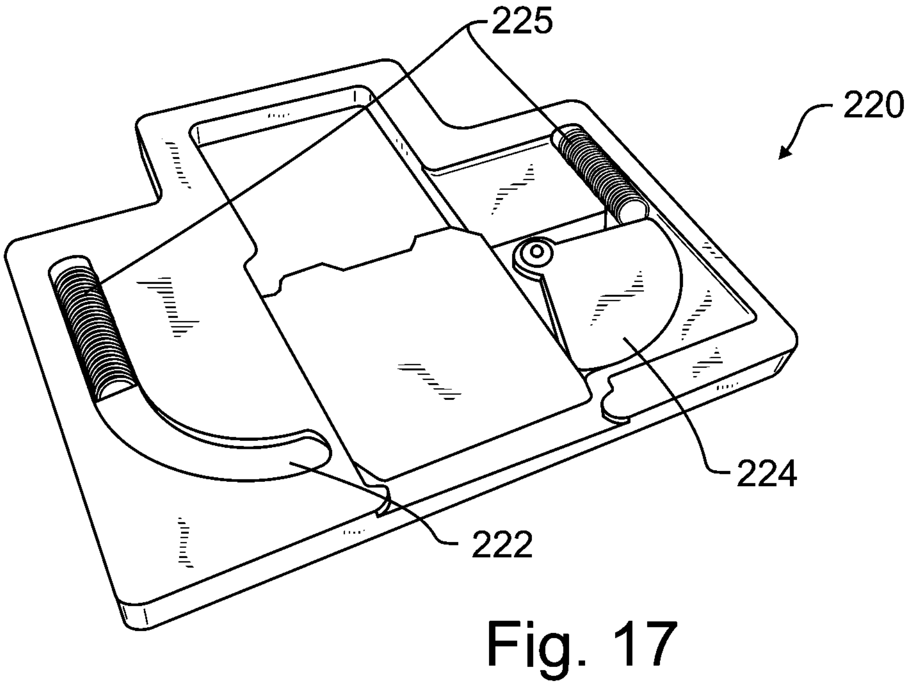

FIGS. 16-17 illustrate a first embodiment washer transfer system 220 that may for exemplary purpose be used in second embodiment screw machine module 250 such as illustrated in FIG. 7. A kicker guide 222 provides a track to direct triangular kicker 224 along a pivotal path, while spring 225 provides for return. A pair of triangular spring-loaded kickers 224 ensure that only one washer 4 is transferred at a time, while the triangular geometry prevents jamming of washers 4. A drive chain 226 rotates the eccentric drive with C-shaped transfer arm 221 in the manner of a crank mechanism, which causes kicker arm actuator plate 227 to reciprocate along a 4-*bar* slider and thereby complete the transfer of a single washer 4 at a time from magazine to installation position. When kicker arm actuator plate 227 is in the position illustrated in FIGS. 16 and 17, it pushes triangular kickers 224 out of contact with the stack of washers 4. However, as kicker arm actuator plate 227 reciprocates to the opposite end of travel such as illustrated in the second embodiment of FIG. 19, triangular kickers 224 will be pushed by compression springs 225 to pivot under the washer stack, thus retaining the washers 4 in the stack. Washer transfer system 220 is preferably housed in the sub-floor of second embodiment screw machine module 250 for protection of components and operator while providing a low-profile package. This is a very compact system available since other options would have to extend outside of bound area, and it is also simple to implement. The chain and sprocket 226 provides mechanical advantage and transfer of torque over longer distance, while in contrast a gear pair would be too large to cover center to center distance required. The 1:1 gear pair reduces fully reversed bending loads on the stepper motor shaft. Tension due to the chain creates excessive loads on stepper motor shaft if connected directly to primary (smaller) sprocket. The gear pair removes this radial load.

Figure 19:
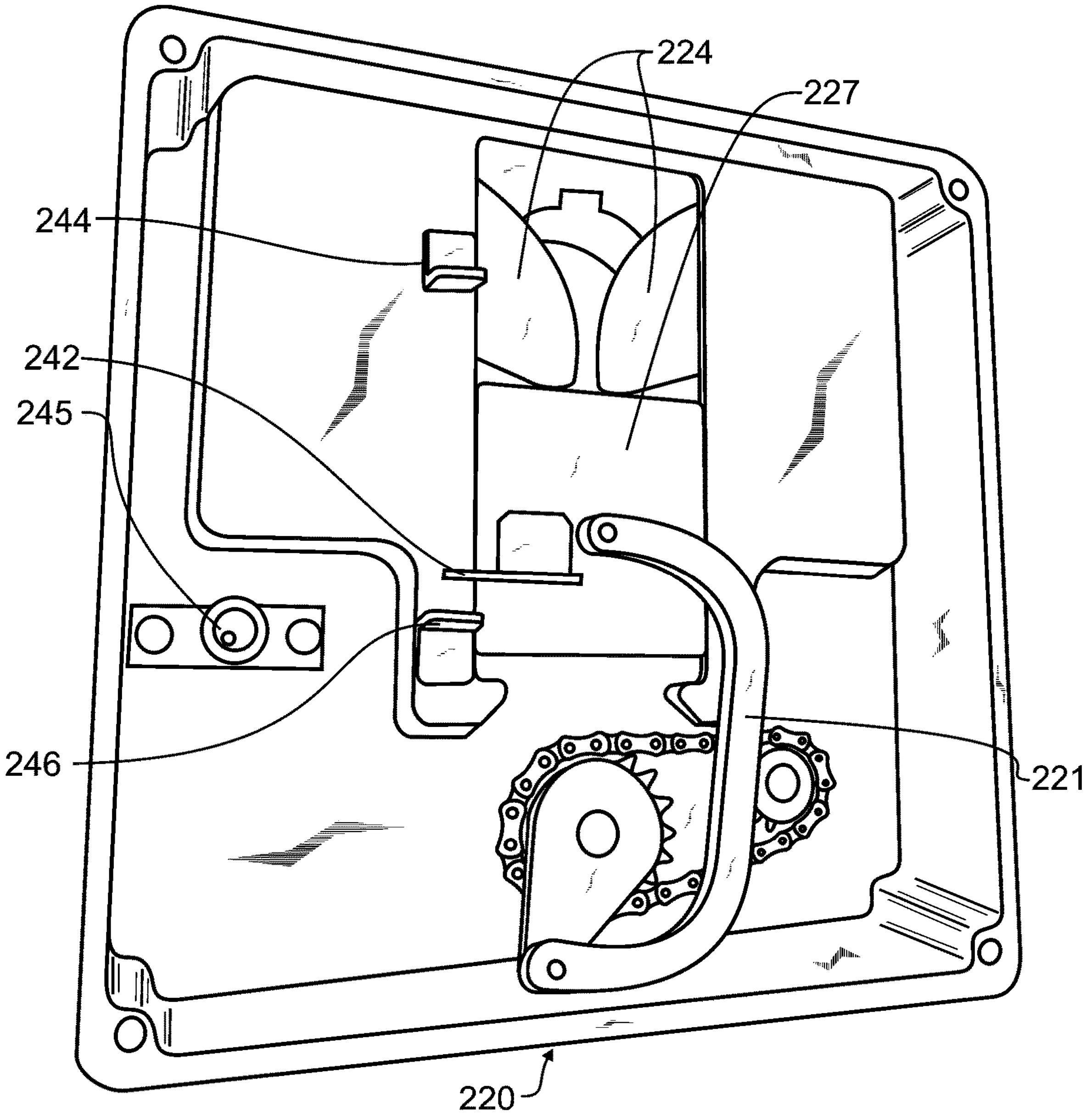
FIG. 19 illustrates the first embodiment washer transfer system of FIGS. 16 and 17, but with the kicker arm actuator plate reciprocated opposite of that illustrated in FIGS. 16 and 17.

The second embodiment washer transfer system 220 illustrated in FIG. 19 is very similar to that of FIGS. 16-17, but includes a set of limit sensors not found in the first embodiment. To monitor the position of washer transfer plate 227 and stop the rotor at the limit positions a first limit sensor 244 is activated when position indicator 242 comes in contact with that sensor. When the washer transfer rotor 221 activates, position indicator 242 moves from the first limit sensor 244 to the second limit sensor 246. When position indicator 242 comes in contact with or moves adjacent to second limit sensor 246, washer transfer rotor 221 is paused while screw 5 is deposited into the screw drop tube 98. Screw 5 will then engage and hold washer 4, while washer transfer rotor 221 can resume and bring washer transfer plate 227 back to the starting position where position indicator 242 comes in contact with or is adjacent to first limit sensor 244.

Figure 18:
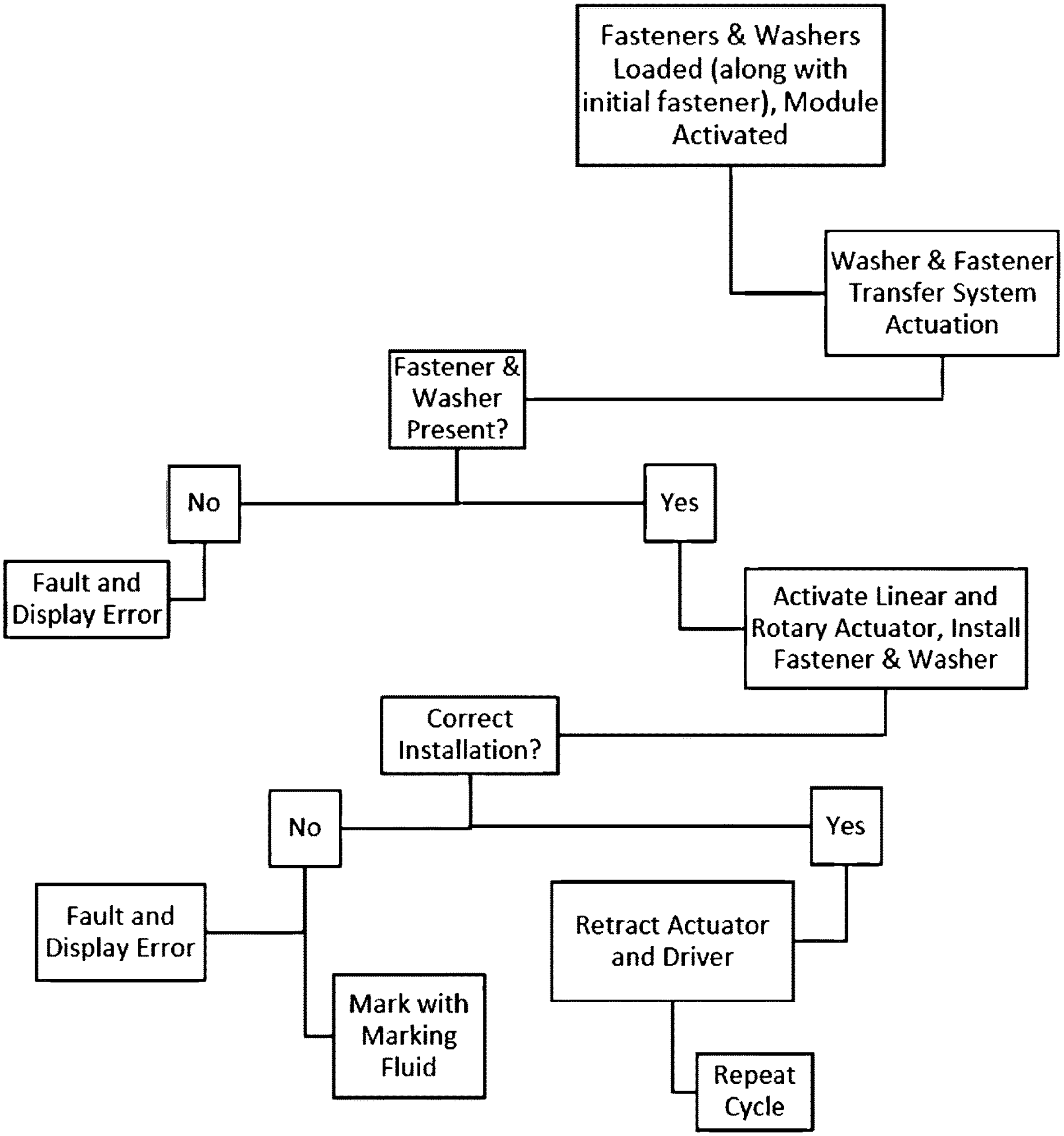
FIG. 18 illustrates a sequence of operations that may for exemplary purpose be used in the preferred embodiment commercial roofing screw machine of FIG. 5 in accord with the teachings of the present invention.

FIG. 18 illustrates a sequence of operations that may for exemplary purpose be used in the screw machine in accord with the teachings of the present invention. The steps and decision tree are self-explanatory and do not require further description herein.

Figure 20:
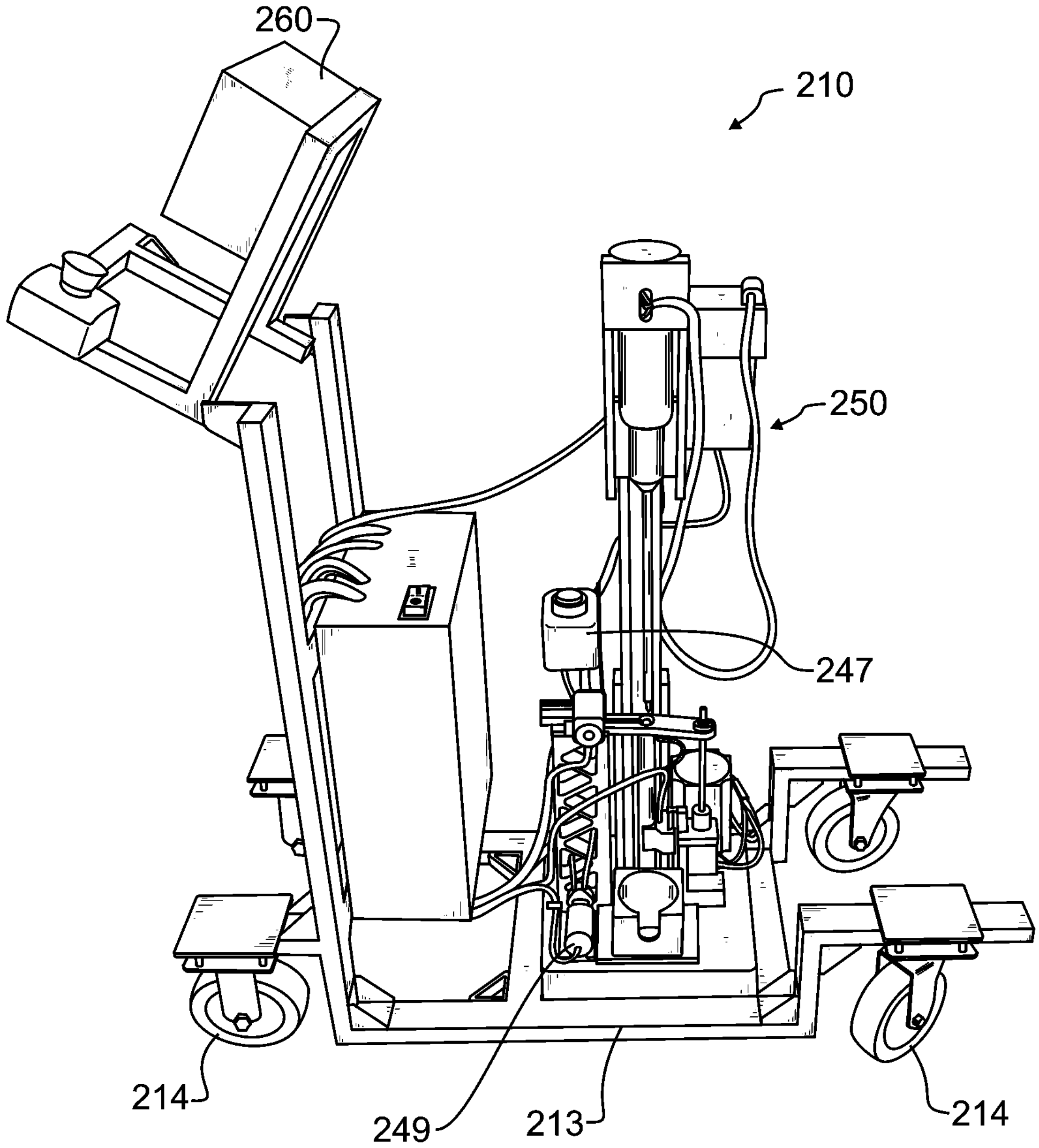
FIG. 20 illustrates a second embodiment automatic screw machine designed in accord with the teachings of the present invention from an upward projected and primarily elevational view, with a few parts removed for purpose of illustration.

FIG. 20 illustrates a second embodiment commercial roofing screw machine 210. This second embodiment commercial roofing screw machine 210 is very similar to preferred embodiment commercial roofing screw machine 10. However, FIG. 20 illustrates additional components of marking system 245, including paint reservoir 247, paint pump 249, and a suitable visible nozzle identified as marking system 245 in FIG. 8. Marking system 245 is activated based on the parameters of installation monitoring 272, using the sequence of operations illustrated in FIG. 18.

Additionally second embodiment commercial roofing screw machine 210 in FIG. 20 illustrates one possible frame 213 and carriage 214 for screw machines designed in accord with the teachings of the present invention. As may be apparent, second embodiment commercial roofing screw machine 210 has only a single screw machine module 250 mounted thereon. Nevertheless, the number and arrangement of screw machine modules 250 will be determined by a designer and is only limited by the ultimate size and dimension of frame 213. Consequently, and referring back to the schematic representation of FIG. 5 and the pattern of screws 5 in attached portion insulation sheet 2, simultaneous installation of eight washer 4 and screw 5 pairs into insulation 1 requires at least eight screw machine modules 250.

Figure 21:
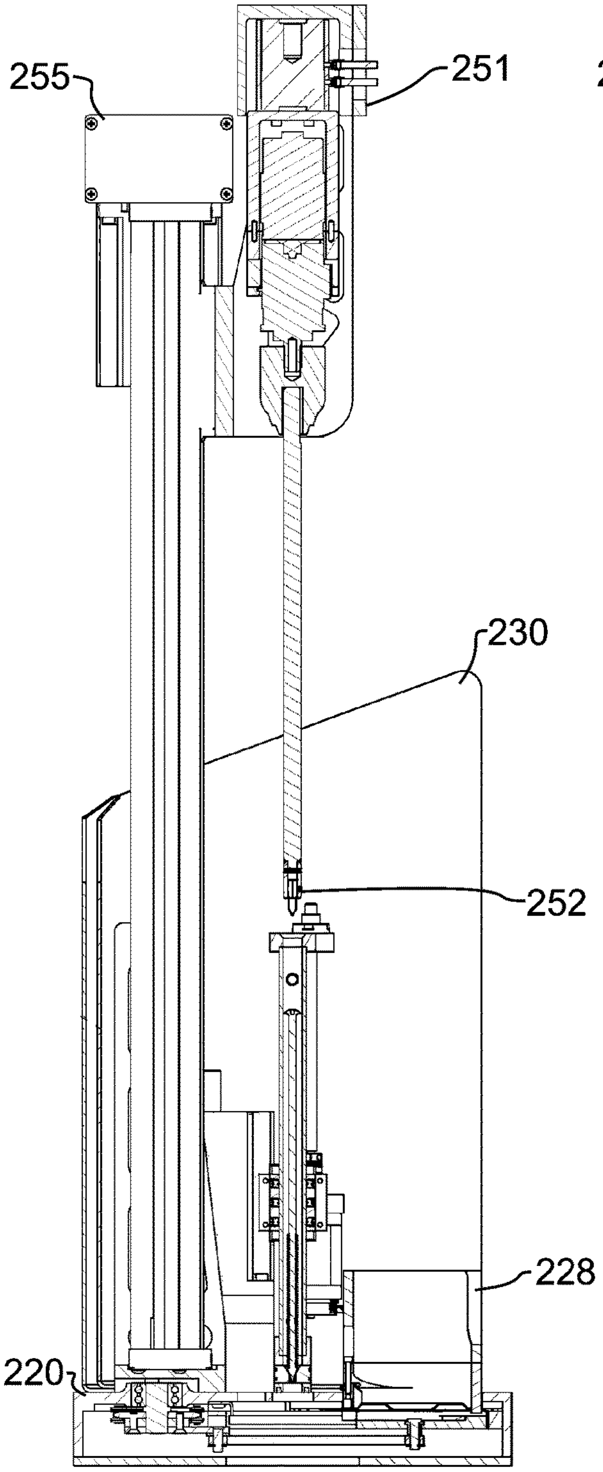
FIGS. 21 and 22 illustrate vertical plane sectional views along the center of the second embodiment screw machine module showing the axially reciprocal installing motion of the screw machine module.
Figure 22:
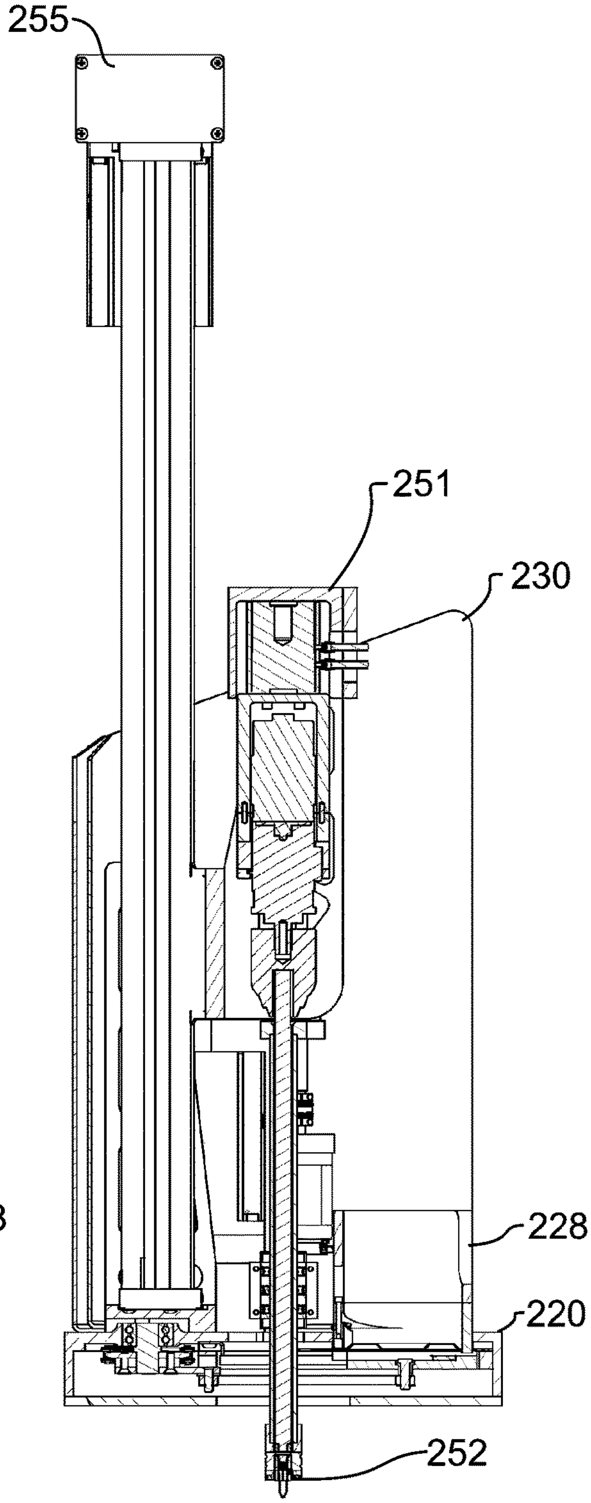

FIGS. 21 and 22 illustrate vertical plane sectional views along the center of screw machine module 250 showing the axially reciprocal installing motion of screw drive motor assembly 251 and screwing head 252, transported in the reciprocal motion by linear reciprocating screw head drive 255.

Figure 23:
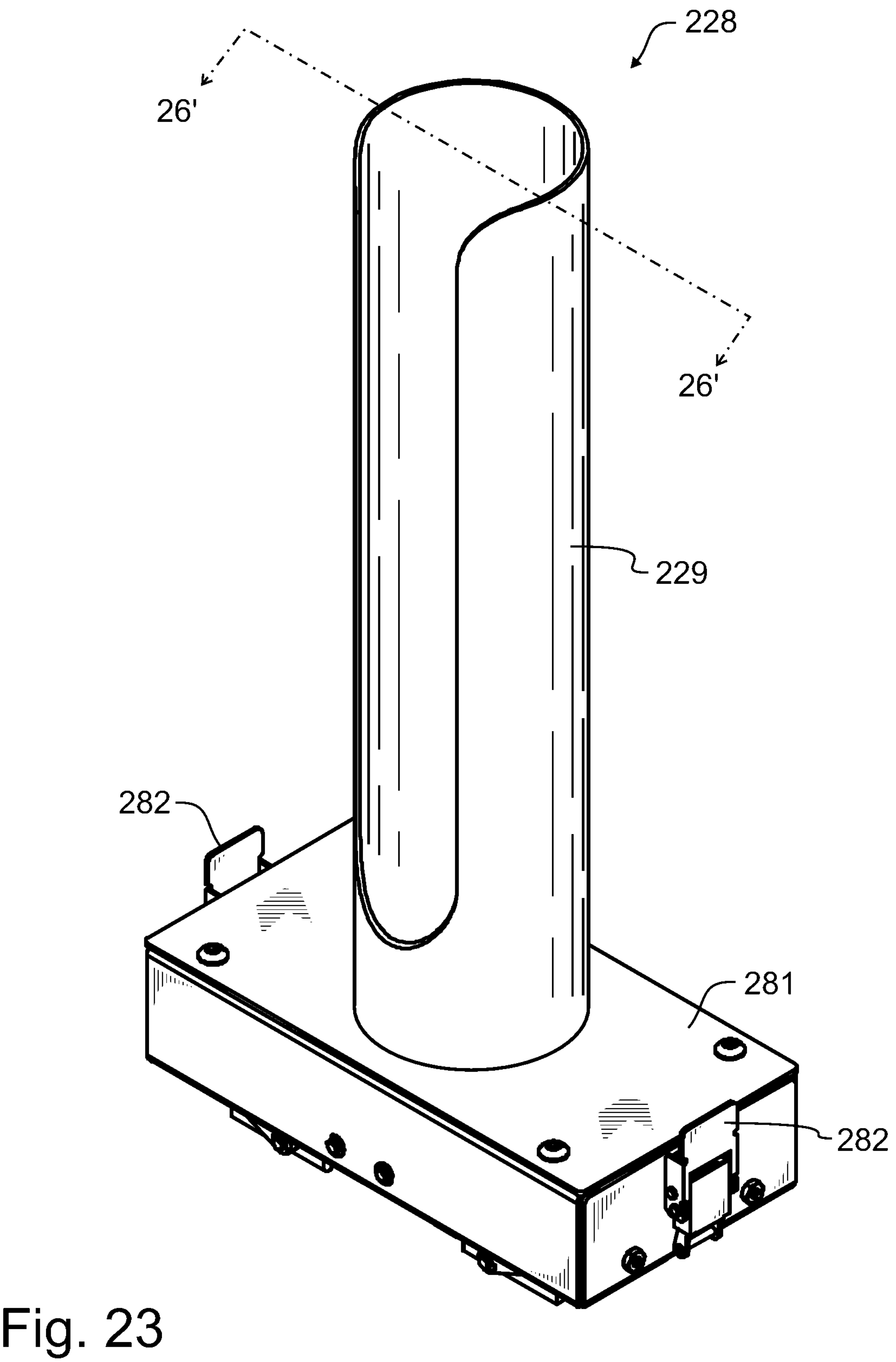
FIG. 23 illustrates a second embodiment washer storage magazine designed in accord with the teachings of the present invention from an isometric view.

FIGS. 23-26 illustrates a second embodiment washer storage magazine 228 designed in accord with the teachings of the present invention in combination with washer stack holder 229. Most notable in the external isometric view of FIG. 23 are the vertically extensive notch cut into the otherwise cylindrical shape of washer stack holder 229, and latches 282. The vertically extensive notch provides convenient visual verification of the current stock of washers 4 held in washer stack holder 229. Latches 228 provide rapid manual attachment and detachment of the entire washer storage magazine 228 including washer stack holder 229. This allows a person to very quickly and easily reload with either identical or even different washers 4, simply by activating latches 282 and swapping out one washer storage magazine 228 for another.

Figure 26:
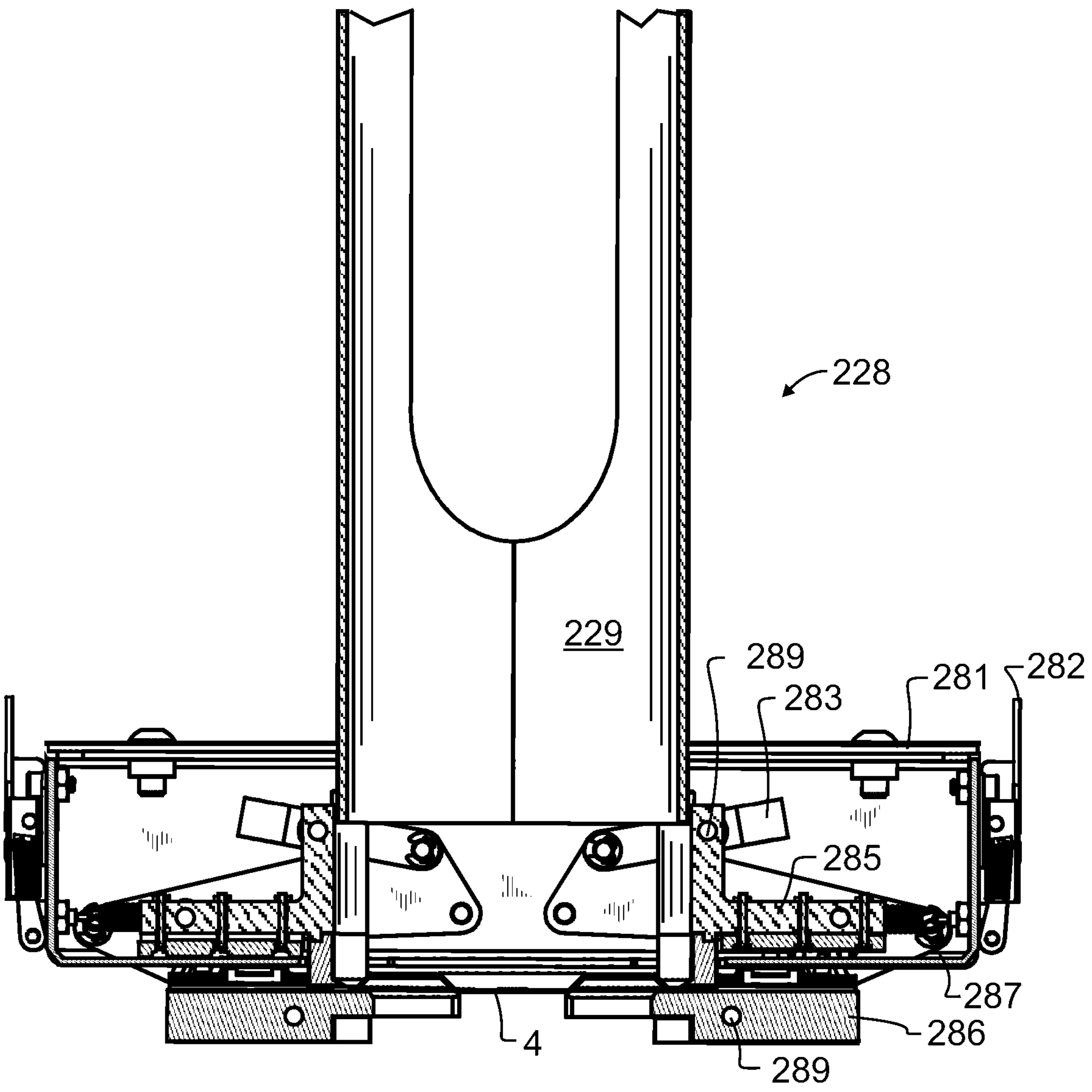
FIG. 26 illustrates the second embodiment washer storage magazine of FIG. 23 from a vertical plane section taken along section line 26' in FIG. 23.

The internal operation of washer storage magazine 228 is best understood from a review of each of FIGS. 24-26. With initial reference to FIG. 25, a linkage 283 couples washer reserve clamp 285 to washer release clamp 286, but in a teeter-totter or see-saw fashion. Said another way, linkage 283 is configured to travel in a first direction urged by return springs 287 to release washer reserve clamp 285, effectively spreading the two opposing jaws of washer reserve clamp 285. This spreading allows any washers 4 stacked therebetween to freely slide downward toward the position of washer 4 illustrated in FIGS. 25 and 26, limited only by other washers 4 already ahead in the queue. At the same time that the two opposing jaws of washer reserve clamp 285 are spreading apart, linkage 283 is urging the two opposed jaws of washer release clamp 286 closer together. This in turn allows all of the washers 4 in the stack to drop down, ultimately supported by the bottom washer 4 in contact with and resting upon the two opposed jaws of washer release clamp 286. When a washer 4 is required to drop into a washer transfer system such as washer transfer system 220, then a motor or linear solenoid, not illustrated for clarity of illustration, but apparent to those reasonably skilled in the art, is energized to work against and extend return springs 287 at any suitable point of leverage within washer storage base housing 281. As noted above, this causes washer reserve clamp 285 to clamp down around the stack of washers 4, except for the bottom most washer 4, again as best visible in FIG. 26. A bottom-most washer 4 is supported underneath and just below the clamping of washer reserve clamp 285. Just subsequent to the clamping force of washer reserve clamp 285 increasing sufficiently to retain the stack of washers 4, washer release clamp 286 will release sufficiently to allow bottom-most washer 4 to drop out of washer storage magazine 228 and into a suitable washer transfer system 220. Next, the motor or linear solenoid is de-energized, closing washer release clamp 286 just before washer reserve clamp 285 releases the waiting stack of washers 4, which will then drop down and complete the cycle.

As evident from FIGS. 24 and 25, a linkage-to-housing pintle 284 provides a pivotal axis for linkage 283. As evident from FIG. 26, coupling shafts 289 may be provided if so desired that couple opposite quarters of the linkages 283 together for simultaneous and balanced movement. This means that at least one return spring 287 is required for each of the right and left halves of the linkages 283 when viewed from the FIG. 26 section. Two such return springs 287 are provided to better balance the forces applied to linear bearing slides 288 during reciprocation. Likewise, one motor or solenoid is required for each half as well, or at least a single motor and suitable drive train to couple to each of the right and left halves of the linkages 283.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. A commercial roofing screw machine, comprising:

a conveyance configured to move said screw machine about a roof;

at least one sensor operative to distinguish roofing subfloor grooves and gaps from elevated attachment surfaces;

a plurality of screw machine modules configured to each simultaneously drive roofing washers and screws through a roofing layer into said elevated attachment surface and thereby affix said roofing layer to said elevated attachment surface;

said conveyance and said at least one sensor cooperative to align each of said plurality of screw machine modules to misalign with said subfloor grooves and gaps during said simultaneous driving of roofing washer and screw through said roofing layer into said elevated attachment surface;

a sensor configured to distinguish a successful screw installation from a failed installation, and produce an failed installation output responsive to distinguishing said failed installation; and a marking apparatus to produce a human readable indicia responsive to said failed installation output that is indicative of and uniquely identifies said failed installation.

2. The commercial roofing screw machine of claim 1, wherein said marking apparatus further comprises a visible marking fluid discharge adjacent to said failed installation.

3. The commercial roofing screw machine of claim 1, wherein said roofing layer further comprises sheet roofing insulation.

4. The commercial roofing screw machine of claim 1, wherein said roofing layer further comprises a roofing membrane.

* * * * *